US011680428B2

(12) United States Patent
Chapuis et al.

(10) Patent No.: US 11,680,428 B2
(45) Date of Patent: Jun. 20, 2023

(54) ADJUSTABLE APPARATUSES TO SECURE ELECTRONIC DEVICES TO DISPLAY TABLES

(71) Applicant: OnQ Solutions, Inc., Hayward, CA (US)

(72) Inventors: Paul F. Chapuis, Woodside, CA (US); Richard B. Bray, Woodside, CA (US); Curtis Acosta, San Jose, CA (US)

(73) Assignee: OnQ Solutions, Inc., Hayward, CA (US)

( * ) Notice: Subject to any disclaimer, the term of this patent is extended or adjusted under 35 U.S.C. 154(b) by 193 days.

(21) Appl. No.: 17/362,354

(22) Filed: Jun. 29, 2021

(65) Prior Publication Data
US 2022/0412129 A1    Dec. 29, 2022

(51) Int. Cl.
E05B 73/00     (2006.01)
F16M 11/22     (2006.01)
A47F 5/10      (2006.01)
F16M 13/02     (2006.01)

(52) U.S. Cl.
CPC ............ E05B 73/0082 (2013.01); A47F 5/10 (2013.01); F16M 11/22 (2013.01); F16M 13/02 (2013.01); F16M 2200/02 (2013.01)

(58) Field of Classification Search
CPC .... F16M 11/22; F16M 13/02; F16M 2200/02; E05B 73/0082; A47F 7/0246; A47F 5/10; Y10T 70/5027
See application file for complete search history.

(56) References Cited

U.S. PATENT DOCUMENTS

| 6,700,488 | B1 | 3/2004 | Leyden et al. |
| 7,187,283 | B2 | 3/2007 | Leyden et al. |
| 7,967,269 | B2 | 6/2011 | Liu |
| 8,061,164 | B2 | 11/2011 | Johnston et al. |
| 8,191,851 | B2 | 6/2012 | Crown |
| 8,240,628 | B2 | 8/2012 | Huang |
| 8,360,373 | B2 | 1/2013 | Johnson et al. |
| 8,701,452 | B2 | 4/2014 | Foster et al. |

(Continued)

FOREIGN PATENT DOCUMENTS

WO    WO2019/213490 A1    11/2019

OTHER PUBLICATIONS

Gripzo, "iPad Enclosure", https://www.gripzo.com/en/products/tablets/ipad-enclosure, downloaded on Jun. 11, 2018.

(Continued)

Primary Examiner — Bradley Duckworth
(74) Attorney, Agent, or Firm — Vierra Magen Marcus LLP

(57) ABSTRACT

An apparatus for physically securing a tablet and a keyboard to a tabletop of a display table or to another display surface is described herein. The apparatus includes a main body, a left arm and a right arm that are extendable and retractable relative to the main body and a left side brace and a right side brace attached respectively to the left arm and the right arm, and configured to be secured to a left side and a right side, respectively, of the tablet and the keyboard. The apparatus further includes a back support extending from the top of the main body with a top arm extending from the back support. The top arm is extendable and retractable relative to the back support along a plane that intersects the top of the main body at an oblique angle.

20 Claims, 19 Drawing Sheets

(56) References Cited

U.S. PATENT DOCUMENTS

| | | | |
|---|---|---|---|
| 8,814,128 | B2 | 8/2014 | Trinh et al. |
| 8,833,716 | B2 | 9/2014 | Funk et al. |
| 8,864,089 | B2 | 10/2014 | Hung |
| 8,925,886 | B2 | 1/2015 | Sears |
| 8,985,544 | B1 | 3/2015 | Gulick, Jr. |
| 8,998,048 | B1 | 4/2015 | Wu |
| 9,022,337 | B2 | 5/2015 | Petruskavich |
| 9,039,785 | B2 | 5/2015 | Gulick, Jr. |
| 9,097,380 | B2 | 8/2015 | Wheeler |
| 9,117,351 | B2 | 8/2015 | Gulick, Jr. et al. |
| 9,159,309 | B2 | 10/2015 | Liu et al. |
| 9,161,466 | B2 | 10/2015 | Huang |
| 9,568,141 | B1 | 2/2017 | Zaloom |
| 9,714,528 | B2 | 7/2017 | Van Balen |
| 9,797,543 | B2 | 10/2017 | Lin |
| 9,936,823 | B2 | 4/2018 | Galant |
| 10,165,873 | B2 | 1/2019 | Gulick, Jr. et al. |
| 10,323,440 | B1 | 6/2019 | Kelsch et al. |
| 10,378,248 | B1 | 8/2019 | Kelsch et al. |
| 10,925,414 | B2 | 2/2021 | Gulick, Jr. |
| 2010/0108828 | A1 | 5/2010 | Yu et al. |
| 2010/0148030 | A1 | 6/2010 | Lin |
| 2011/0133050 | A1 | 6/2011 | Eisenberger et al. |
| 2012/0037783 | A1 | 2/2012 | Alexander et al. |
| 2012/0234055 | A1 | 9/2012 | Bland, III et al. |
| 2013/0301216 | A1 | 11/2013 | Trinh et al. |
| 2013/0318639 | A1 | 11/2013 | Gulick, Jr. |
| 2014/0060218 | A1 | 3/2014 | Bisesti et al. |
| 2014/0263931 | A1 | 9/2014 | Chen |
| 2015/0089675 | A1 | 3/2015 | Gulick, Jr. |
| 2015/0108948 | A1 | 4/2015 | Gulick, Jr. et al. |
| 2015/0196140 | A1 | 7/2015 | Lin |
| 2015/0300050 | A1 | 10/2015 | Van Balen |
| 2017/0049251 | A1 | 2/2017 | Gulick, Jr. et al. |
| 2017/0188724 | A1 | 7/2017 | Lin |
| 2018/0058107 | A1 | 3/2018 | Lucas et al. |
| 2019/0316386 | A1 | 10/2019 | Gulick, Jr. et al. |
| 2021/0059437 | A1 | 3/2021 | Chapuis et al. |

OTHER PUBLICATIONS

Gripzo, "iPhone", https://www.gripzo.com/en/products/smartphones/iphone, downloaded on Jun. 11, 2018.

Scorpion Security Products, "4-Point ERS Phone Scorpion", https://www.scorpionsecurityproducts.com/product/4-point-ers-phone-scorpion/, downloaded on Jun. 11, 2018.

Scorpion Security Products, "4-Point ERS Small Tablet Scorpion", https://www.scorpionsecurityproducts.com/product/4-point-ers-small-tablet-scorpion/, downloaded on Jun. 11, 2018.

Dongguan Comer Electronic Technology Co., Ltd., "Comer Anti-Theft Locking Laptop Mechanical Security Display Frame for Mobile Phone Stores", http://www.comerdisplay.com/sale-8024631-comer-anti-theft-locking-laptop-mechanical-security-display-frame-for-mobile-phone-stores.html, downloaded on Jun. 11, 2018.

Dongguan Comer Electronic Technology Co., Ltd., "Comer Universal Display Mechanical Anti-Theft Security Display Locking System for Tablet Brackets", http://www.smartcomer.com/sale-8028445-comer-universal-display-mechanical-anti-theft-security-display-locking-system-for-tablet-brackets.html, downloaded on Jun. 11, 2018.

RTF, "Vise—Securely and Attractively Placing Your Product First", http://www.rtfglobal.com/products/vise-cell-phone-security/, downloaded on Jun. 11, 2018.

RTF, "Smartphones—Samsung Note 3, LG Flex, HTC One, Apple iPhone 5, Blackberry Z10", http://www.rtfglobal.com/solutions/by-devices-type/smartphones/#!prettyPhoto, downloaded on Jun. 11, 2018.

Gripzo, "Universal Smartphone Grip/ Universal Tablet Grip", https://www.gripzo.com/en/products/smartphones/phone, downloaded on Jun. 14, 2018.

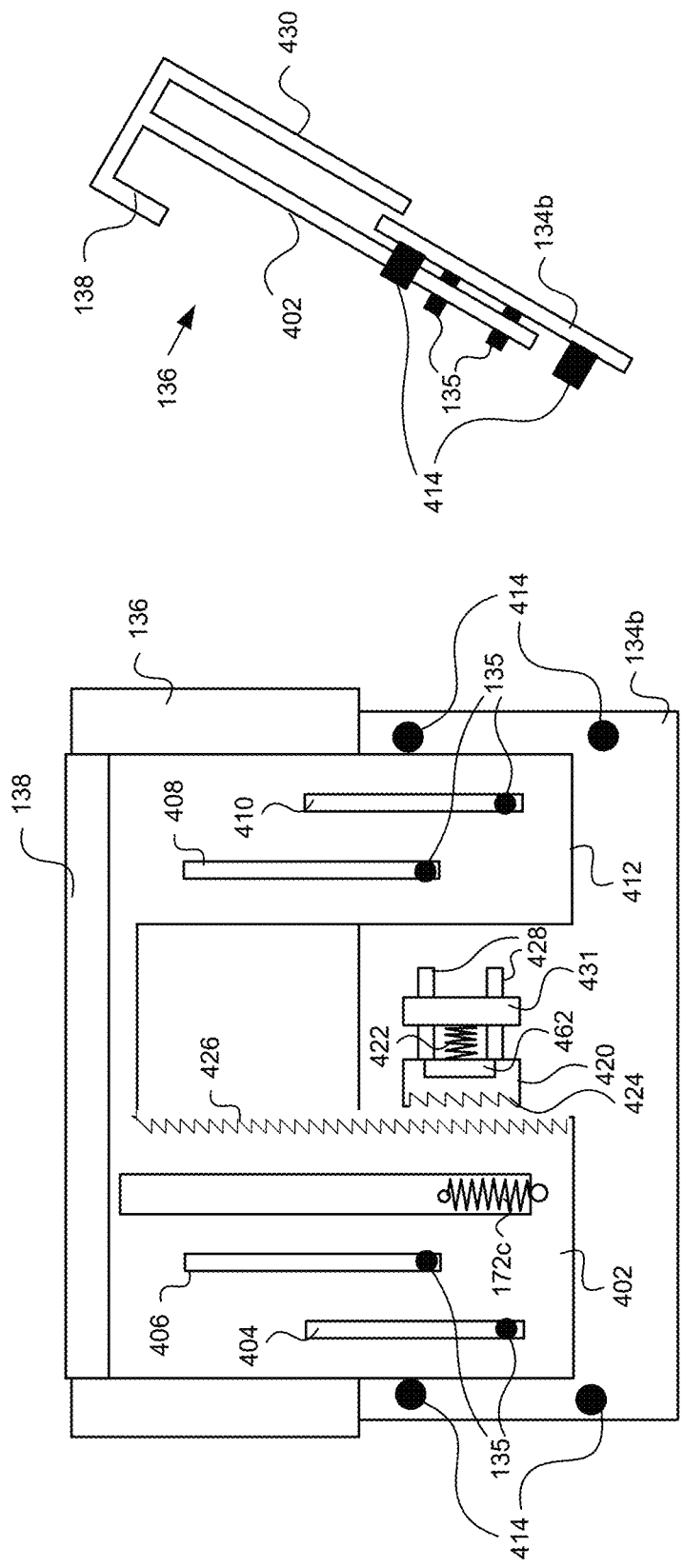

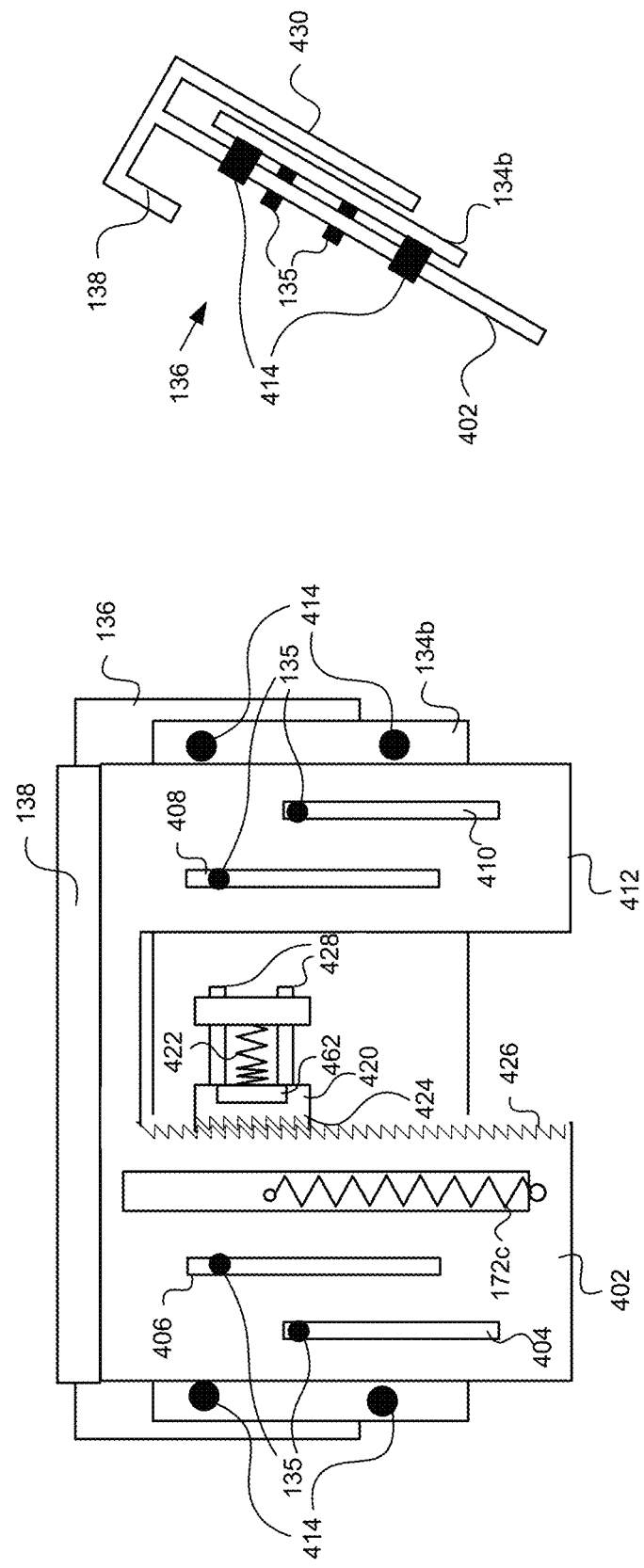

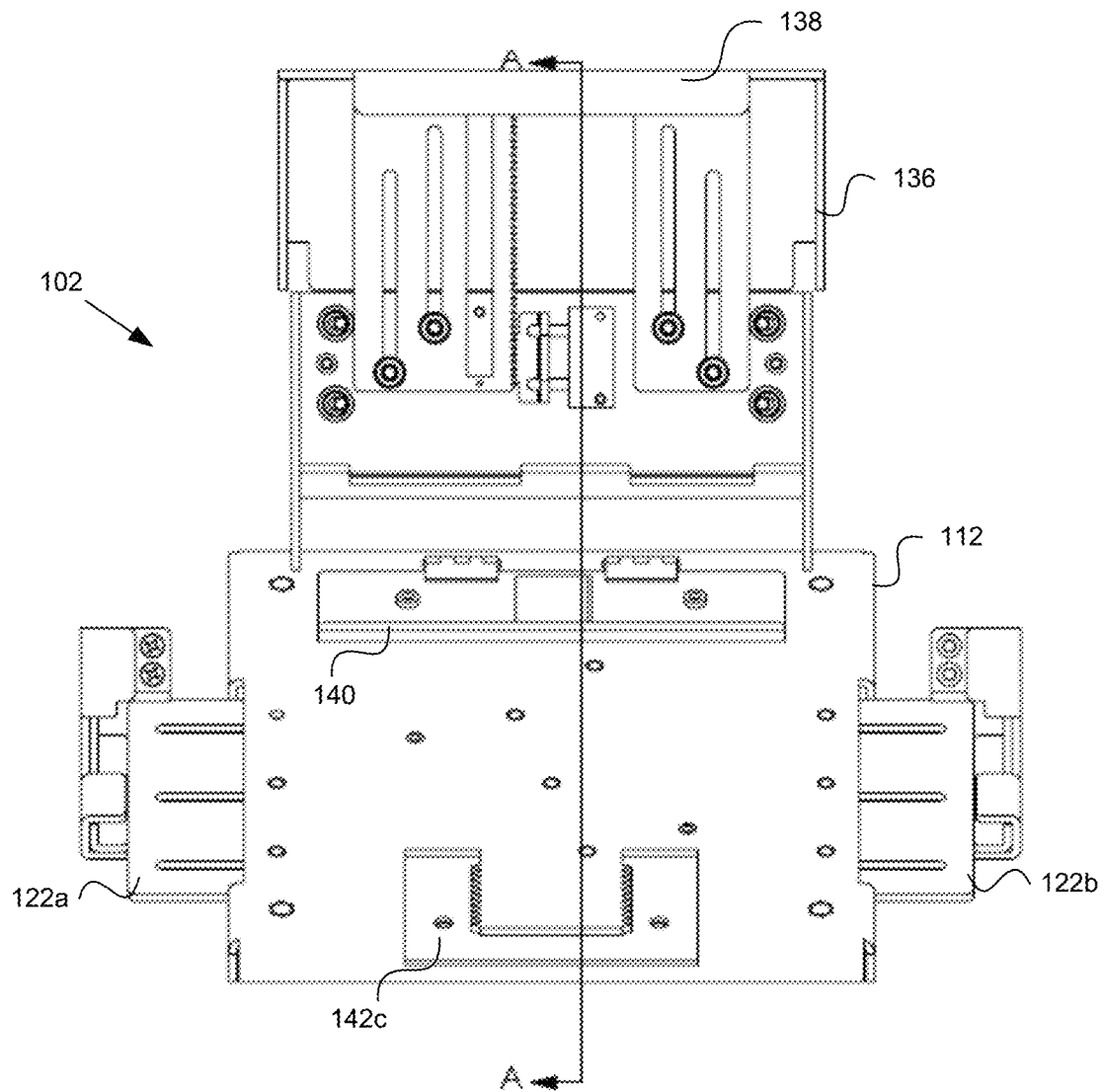

ADJUSTABLE APPARATUSES TO SECURE ELECTRONIC DEVICES TO DISPLAY TABLES

FIELD OF TECHNOLOGY

Embodiments of the present technology relate to apparatuses to physically secure electronic devices to tabletops of display tables or to other display surfaces.

BACKGROUND

Portable electronic devices, such as tablets, are often sold in retail stores. Tablets (tablet computers), as the term is used herein, are generally formed as a rectangular body having a display screen (e.g., touch screen) occupying most or all of a primary surface. In some examples, one or more control devices (e.g., buttons) may be provided on the same surface as the touch screen and/or on secondary surfaces (e.g., on side surfaces). In contrast to laptop computers (laptops), tablets may not have built-in keyboards. While a portion of a touchscreen may be configured as a keyboard by suitable software, this may not be an ideal configuration (e.g., because significant screen area is consumed by the keyboard and the keyboard is in the same plane as the display).

To provide additional functionality, a tablet may be used with an external keyboard and/or other peripheral devices. In some cases, an external keyboard and a tablet may be arranged so that the keyboard is substantially horizontal and the tablet forms an obtuse angle with the tablet (similar to the keyboard and display screen of a laptop). A tablet stand or support may be used to maintain a tablet in a suitable orientation. In some examples, a case or protective cover may be configurable to function as a tablet stand that maintains a tablet at an appropriate angle for viewing while the keyboard is substantially horizontal along the bottom edge of the tablet. Such a case may enclose the tablet (and, in some cases, the keyboard also) for protection when in a closed configuration. A keyboard and/or case may be compatible with one or more tablet and may be sold with a tablet as a package or may be purchased separately. A tablet and keyboard may be displayed together in a retail store so that a potential customer can experience using the tablet with a keyboard.

SUMMARY

Embodiments of the present technology relate to an apparatus for physically securing a tablet and a keyboard to a tabletop of a display table or to another display surface, the apparatus including a main body having a top, a bottom, and walls that extend between the top and the bottom; a left slot and a right slot in left and right walls respectively of the main body; a left arm and a right arm that extend respectively through the left slot and the right slot, the left and right arms are extendable and retractable relative to the main body; and a left side brace and a right side brace attached respectively to the left arm and the right arm, and configured to be secured to a left side and a right side, respectively, of each of the tablet and the keyboard. The apparatus further includes a front side brace extending from a front wall of the main body; a back support extending from the top of the main body; a top arm extending from the back support, the top arm is extendable and retractable relative to the back support along a plane that intersects the top of the main body at an oblique angle; and a plurality of fasteners that extend downward from the bottom of the main body and are attachable to a tabletop of a display table or to another display surface to thereby secure the main body to the tabletop or other display surface.

In accordance with certain embodiments, the apparatus further includes a first lock mechanism configured lock the left and right arms in place after they have been at least partially retracted to thereby secure sides of the keyboard and the tablet to the main body; and the first lock mechanism also configured to allow a user to selectively release the left and right arms to thereby enable the left and right arms to be extended to thereby allow the keyboard to be unsecured from the main body.

In accordance with certain embodiments, the apparatus includes a second lock mechanism configured to lock the top arm in place in an at least partially retracted position to thereby secure a top edge of the tablet to the back support; and the second lock mechanism also configured to allow a user to selectively release the top arm to thereby enable the top arm to be extended and enable the top edge of the tablet to be unsecured from the back support.

In accordance with certain embodiments, the first and second lock mechanisms are inaccessible when the main body is attached to a tabletop or to another display surface and the tablet is secured, thereby preventing someone from releasing the left and right arms with the tablet and the keyboard secured and the main body attached to the tabletop.

In accordance with certain embodiments, the back support includes a lower portion that forms an acute angle with the top of the main body and an upper portion that attaches the top arm and includes a lock mechanism for the top arm, the upper portion forming an obtuse angle with the lower portion.

In accordance with certain embodiments, the acute angle provides a space for a tablet stand such that the tablet, keyboard, and tablet stand are securable together with the tablet stand in a deployed configuration.

In accordance with certain embodiments, the apparatus further includes a blocker tab that is hinged about an axis extending along the top of the main body where the back support extends from the main body, the blocker tab configurable to block a back portion of the top of the main body in a first configuration and to open the back portion of the top of the main body in a second configuration to accommodate different types of tablet stands.

In accordance with certain embodiments, the left and right side braces are configurable to secure a tablet in a first position with a lower edge of the tablet located substantially along the top of the main body and in a second position with a lower edge of the tablet displaced above the top of the main body.

In accordance with certain embodiments, the left and right side braces each form a first slot extending parallel to the top of the main body to secure sides of the keyboard and a second slot extending at an obtuse angle to the top of the main body to secure sides of the tablet.

In accordance with certain embodiments, the front side brace is hook-shaped in cross-section along a vertical plane to engage a front edge of a keyboard, the front side brace configurable to extend different distances from the front wall of the main body to accommodate keyboards of different sizes.

Embodiments of the present technology relate to an apparatus for physically securing a tablet, keyboard, and tablet stand to a tabletop of a display table or to another display surface with the tablet stand deployed, the apparatus including: a main body having a top surface; a back support extending from a back edge of the top surface, the back support including a back support surface that extends along a plane that forms an obtuse angle with the top surface to support the tablet with the tablet stand deployed; a top arm attached to the back support, the top arm extendable and retractable relative to the back support to secure a top edge of the tablet; a left arm, a right arm, and a front arm each of which is extendable and retractable relative to the main body; a left side brace and a right side brace, attached to the left and right arms respectively, and configured to engage left sides and right sides, respectively, of the keyboard and the tablet with the tablet stand deployed; a first lock mechanism configured to lock the left and right arms in place with the left and right arms at least partially retracted into the main body to engage the keyboard and the tablet; and a second lock mechanism configured to lock the top arm in place with the top arm at least partially retracted with respect to the back support.

In accordance with certain embodiments, the top arm is spring-loaded to extend outward along the plane when the second lock mechanism is disengaged to allow insertion of the tablet; and the second lock mechanism includes a ratchet to allow only inward movement of the top arm and prevent outward movement of the top arm when the second lock mechanism is engaged.

In accordance with certain embodiments, the second lock mechanism is inaccessible with the tablet lying along the back support surface.

In accordance with certain embodiments, the left side brace and the right side brace each include a respective slot extending along the plane to engage left and right sides respectively of the tablet with the tablet lying along the back support surface.

In accordance with certain embodiments, the left side brace and the right side brace are configurable to engage a lower edge of the tablet at a predetermined height above the top surface in a first configuration and to engage left and right sides of the tablet and not the lower edge of the tablet in a second configuration.

In accordance with certain embodiments, the back support includes a lower portion that that forms an acute angle with the top surface such that with the tablet in place extending along the plane, the tablet, top surface, and the lower portion form a volume that is triangular in cross-section to accommodate the tablet stand.

In accordance with certain embodiments, the apparatus further includes a blocker tab that is configurable to block at least a portion of the top surface in the volume in a first configuration to accommodate a tablet stand having a first horizontal extent and to leave the portion of the top surface in the volume open in a second configuration to accommodate a tablet stand having a second horizontal extent.

In accordance with certain embodiments, the apparatus further includes a plurality of fasteners that extend downward from a bottom surface of the main body and are attachable to a tabletop of a display table or to another display surface to thereby secure the main body to the tabletop or other display surface.

Embodiments of the present technology relate to an apparatus for physically securing a tablet, keyboard, and tablet stand in a deployed configuration to a tabletop of a display table or to another display surface, the apparatus comprising: a main body having a top surface, a bottom surface, and walls that extend between the top and bottom surfaces; a left slot in a left wall of the main body; a left arm that extends through the left slot and is extendable and retractable relative to the main body; a left side brace attached to the left arm, the left side brace including a lower slot parallel to the top surface to secure a left side of the keyboard and an upper slot at an obtuse angle to the lower slot to secure the left side of the tablet; a right slot in a right wall of the main body; a right arm that extends through the right slot and is extendable and retractable relative to the main body; a right side brace attached to the right arm, the right side brace including a lower slot parallel to the top surface to secure a right side of the keyboard and an upper slot at an obtuse angle to the lower slot to secure the right side of the tablet; a front side brace extending from a front wall of the main body and forming a front slot to secure a front edge of the keyboard; a back support extending from the top surface of the main body; a top arm extending from the back support, the top arm is extendable and retractable relative to the back support along a plane that intersects the top surface of the main body at an oblique angle; and a plurality of fasteners that extend downward from the bottom surface of the main body and are attachable to a tabletop of a display table or to another display surface to thereby secure the main body to the tabletop or other display surface.

In accordance with certain embodiments, the apparatus further comprises: a first ratchet configured to secure the left and right arms in place in a retracted position; a first spring configured to extend the left and right arms from the main body in response to release of the first ratchet; a second ratchet configured to secure the top arm in place in a retracted position; and a second spring configured to extend the top arm from the back support in response to release of the second ratchet.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 4A-J illustrate examples of extension and retraction of a top arm of an adjustable mount.

DETAILED DESCRIPTION

Embodiments of the present technology generally relate to apparatuses that can be used to physically secure tablets and keyboards to tabletops of display tables or to other display surfaces. The benefits, features, and advantages of the various embodiments of the present technology will become better understood with regard to the following description and accompanying drawings. The following description is presented to enable one of ordinary skill in the art to make and use embodiments of the present technology as provided within the context of a particular application and its requirements. Various modifications to the embodiments described herein will, however, be apparent to one skilled in the art, and the general principles defined herein may be applied to other embodiments. Therefore, the embodiments of the present invention are not intended to be limited to the particular embodiments shown and described herein, but are to be accorded the widest scope consistent with the principles and novel features herein disclosed.

Figure 1:
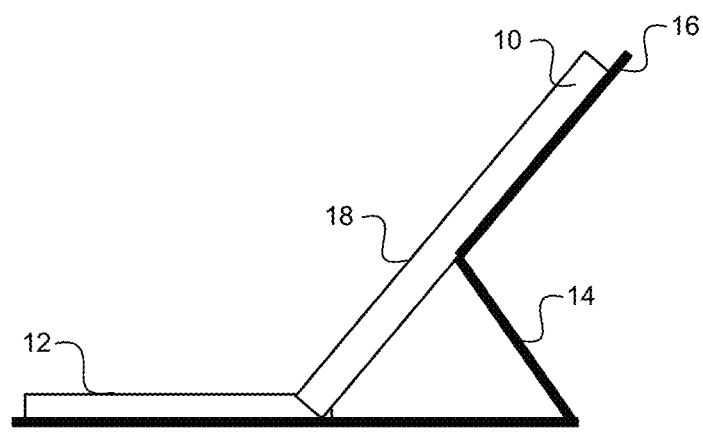
FIG. 1 shows an example of a tablet, tablet stand, and keyboard.

FIG. 1 shows an example of a tablet 10 and keyboard 12 with a tablet stand 14 formed by a portion of a case 16 in side view. In this example, the case 16 is deployed as a tablet stand by folding it as shown so that it maintains tablet 10 at an appropriate angle for viewing (this angle may be fixed or may be adjustable by a user in some designs). When not deployed as a tablet stand, case 16 may fold about tablet 10 to cover touchscreen 18 of tablet 10. Case 16 may be attached to keyboard 12 to maintain keyboard 12 in the location shown (along the bottom edge of tablet 10) when deployed and to enclose keyboard 12 with tablet 10 when not deployed. Other tablet stands may not fold in this manner and the present technology is not limited to any particular type of tablet stand (e.g., a tablet stand may not be formed from a case). Tablet 10 and keyboard 12 may be communicatively coupled by an appropriate coupling, which may be a wired coupling (e.g., USB) or wireless (e.g., Bluetooth).

In order to provide a potential buyer with a realistic user experience in a retail store, a tablet and a keyboard may be displayed together in a configuration similar to that shown in FIG. 1 (e.g., with a tablet stand in a deployed configuration holding a tablet and a keyboard ready for use). Such a display provides certain security challenges. For example, an apparatus that may secure a tablet alone may not accommodate a tablet and a keyboard deployed as shown. An apparatus that is designed to secure a laptop may not adequately secure a combination of a tablet and a keyboard that are easily separable and may not accommodate a deployed tablet stand.

Figure 2A:
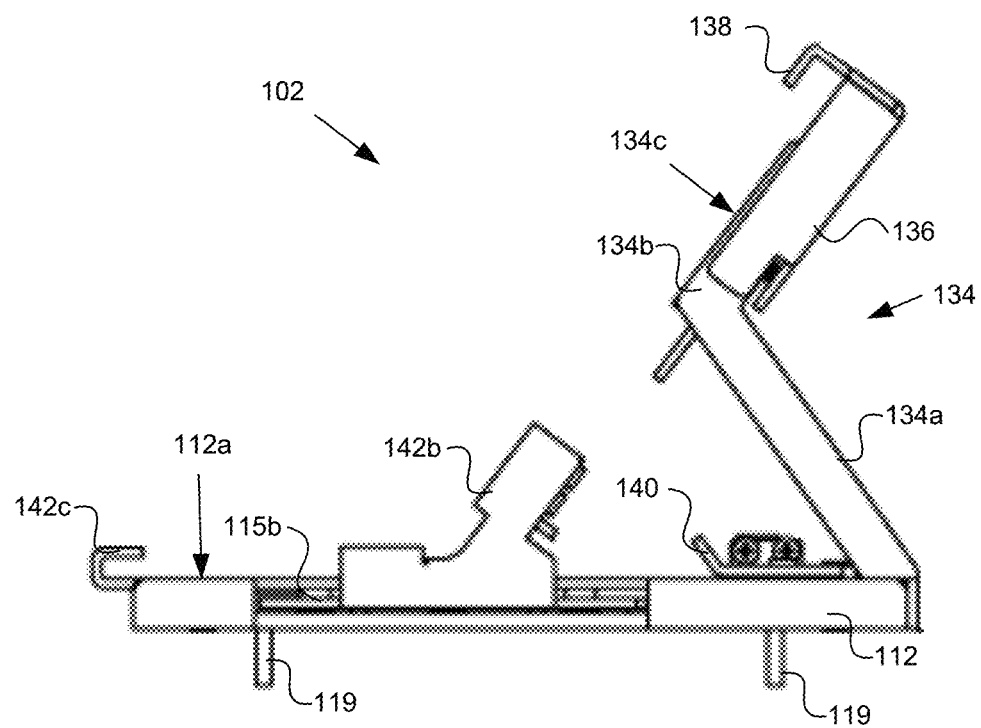
FIGS. 2A-C illustrate an example of an adjustable mount for a tablet, tablet stand, and keyboard, according to an embodiment of the present technology.
Figure 2B:
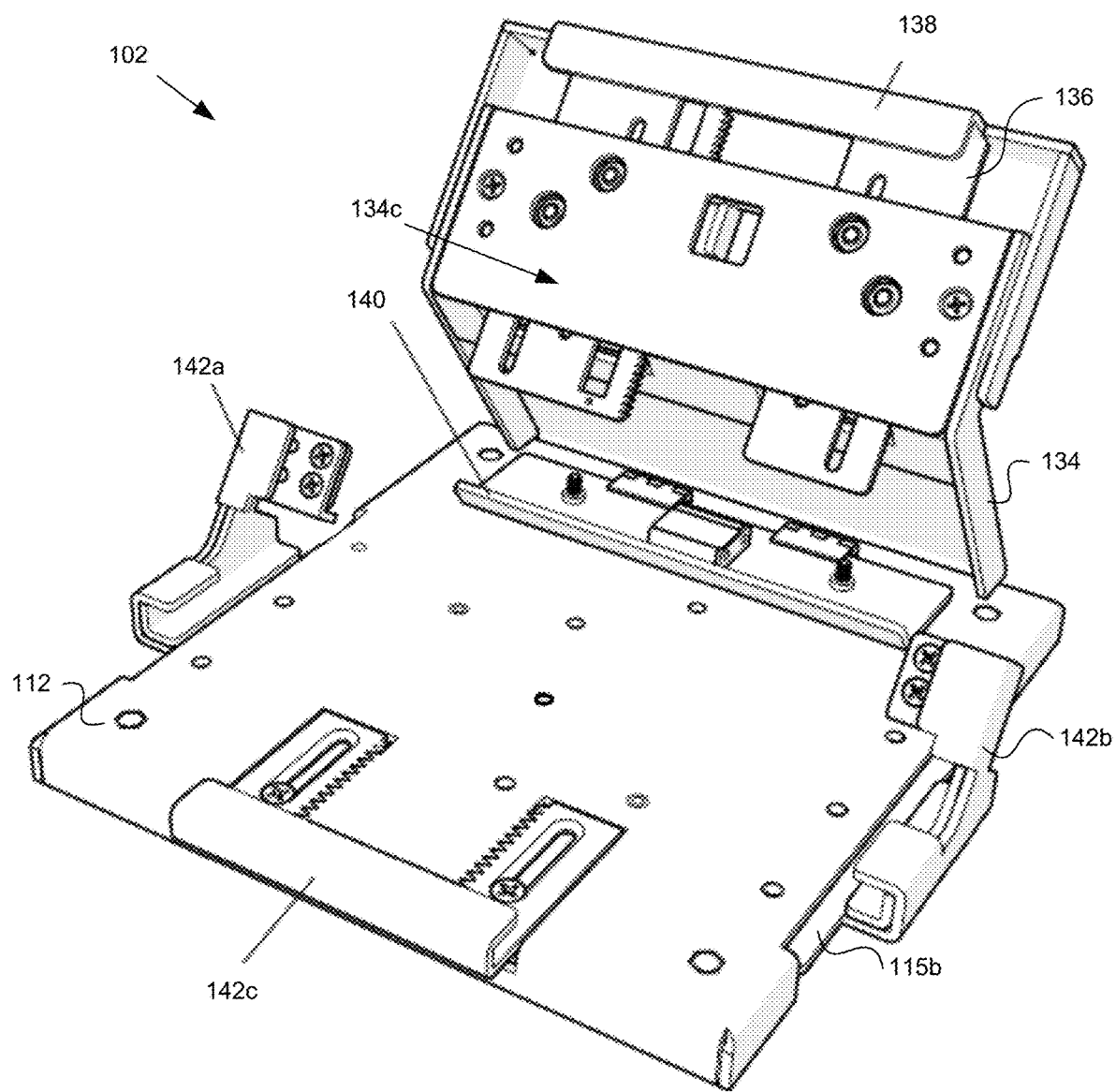
Figure 2C:
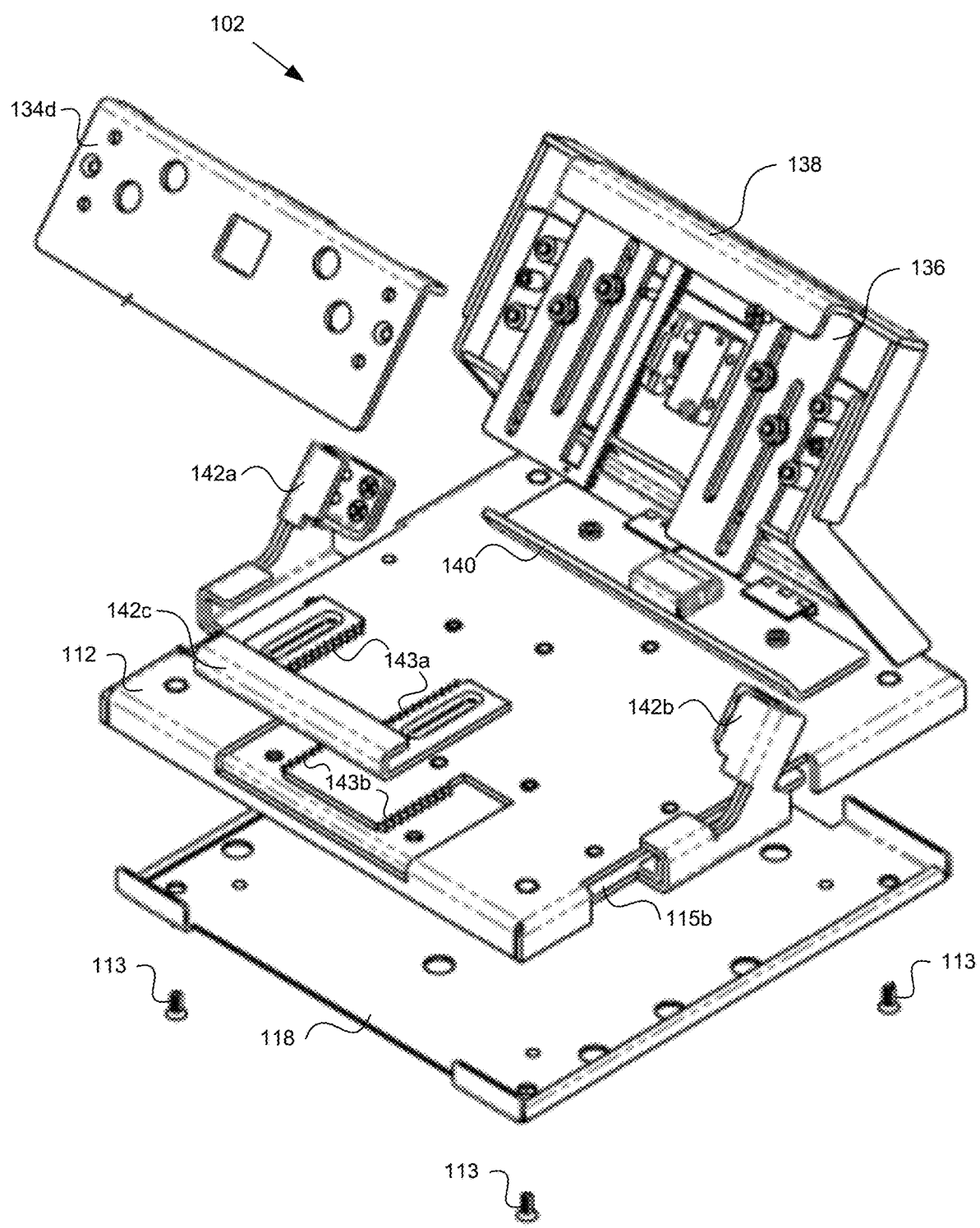

FIG. 2A is a side view of an adjustable tablet security mount 102, according to an embodiment of the present technology, which can be used to mount a tablet, a keyboard, and a deployed tablet stand (e.g., substantially as illustrated in FIG. 1) to a tabletop of a display table or to another display surface. The adjustable tablet security mount 102 can also be referred to more succinctly herein as the security mount 102, or even more succinctly as the mount 102. FIG. 2B shows a perspective view of the mount 102 and FIG. 2C shows an exploded view of the mount 102 introduced in FIG. 2A. As will be appreciated from the following discussion, because of the adjustability of the security mount 102 it can beneficially be used with tablets of various different dimensions, keyboards of various different dimensions, and tablet stands (including stands formed by folding cases) of various different dimensions, including various different widths, depths, and thicknesses.

Referring to FIG. 2A, the mount 102 is shown as including a main body 112, a back support 134, a top arm 136, a top brace 138, a right side brace 142b (FIG. 2A shows the right side of mount 102), and a front side brace 142c. The main body 112 is shown as including a right side slot 115b in the right wall of main body 112, which can also be referred to more specifically as the right side slot 115b. A similar slot is provided in the left wall for a corresponding left arm. Extending downward from the bottom of main body 112 are fasteners 119 (e.g., threaded bolts).

Back support 134 extends from a back edge of upper surface 112a of main body 112 and may be securely attached to main body 112 (e.g., main body 112 and back support 134 may be formed of steel or other suitable metal or alloy and may be welded together for security). Back support 134 includes a lower portion 134a, which forms an acute angle with upper surface 112a of main body 112, and an upper portion 134b, which is angled with respect to lower portion 134a and forms a back support surface 134c for a tablet (e.g., extends along a plane at an angle that is compatible with a user viewing angle and with angles provided by tablet stands to be displayed). Top arm 136 is attached to upper portion 134b and is configurable to extend to accommodate tablets of different sizes. Top brace 138 is hook-shaped in cross-section from the side as illustrated in FIG. 2A in order to engage a top edge of a tablet. Top arm 136 and top brace 138 may be integrally formed (e.g., from a single piece of metal), welded together, or otherwise joined in a secure manner.

A blocker tab 140 is shown blocking a portion of an upper surface 112a of main body 112. Blocker tab 140 is hinged along the base of lower portion 134a so that it can be configured to accommodate different tablet stands (tablet stands of different horizontal extent). In the configuration shown, blocker tab 140 is down and occupies a back portion of upper surface 112a while in another configuration, blocker tab 140 is rotated upwards (e.g., into lower portion 134a) to leave upper surface 112a clear as far as the bottom of lower portion 134a. This allows tablet stands of different sizes to be accommodated in the space formed in the acute angle between upper surface 112a and lower portion 134a of back support 134 (space or volume that is triangular in cross-section shown) without freedom of movement that might allow a tablet stand and/or keyboard and/or tablet to be worked free of securing features.

FIG. 2B shows a perspective view of mount 102 including main body 112, left side brace 142a, right side brace 142b, front side brace 142c, right side slot 115b, back support 134 including back support surface 134c, top arm 136, top brace 138, and blocker tab 140.

FIG. 2C shows an exploded view of mount 102 including a cover plate 118 that covers the bottom of main body 112 (forming the bottom surface of main body 112) and is attached by screws 113. Because screws 113 are accessed from below, they are inaccessible when mount 102 is attached to a surface (e.g., bolted by fasteners 119). Also shown is cover plate 134d that forms back support surface 134c. With cover plate 134d removed as shown, top arm 136 is clearly visible including features that allow top arm 136 and top brace 138 to extend and retract (described in more detail below).

Front side brace 142c is shown displaced above main body 112 and rows of indentations 143a (teeth) are shown along edges of front side brace 142c so that they can engage corresponding rows of indentations 143b formed along sides of a recessed portion of main body 112. This allows the position of front side brace 142c to be secured when front side brace 142c is in position (e.g., screwed to main body 112) with indentations 143a engaging indentations 143b and allows the position off front side brace 142c to be changed when it is raised to disengage indentations 143a and 143b.

FIG. 2C shows left side brace 142a and right side brace 142b in a retracted position (close main body 112). While not visible in FIG. 2C, left side brace 142a, right side brace 142b are attached to corresponding arms that enable them to extend outward from main body 112 to facilitate attachment of a tablet, keyboard and/or tablet stand.

Figure 3A:
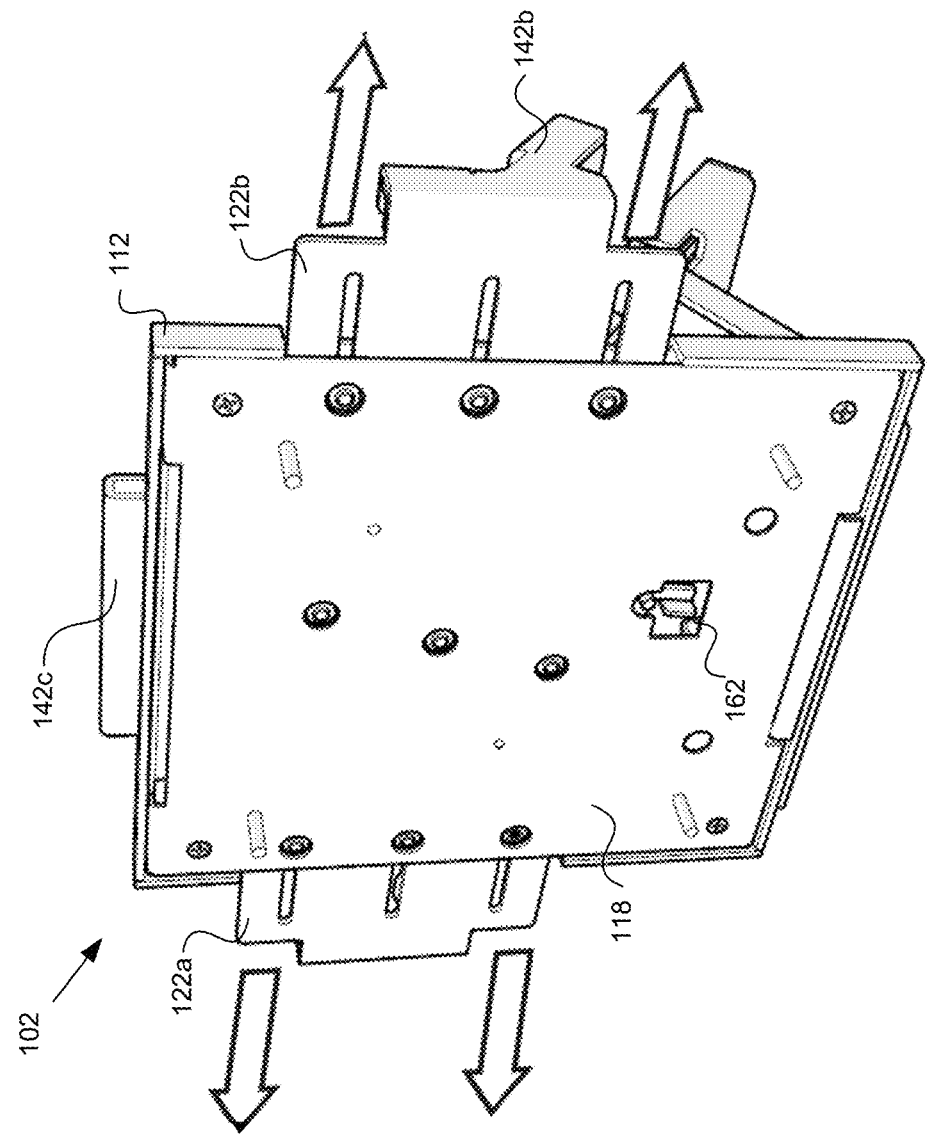
FIGS. 3A-E illustrate examples of extension and retraction of arms of an adjustable mount.

FIG. 3A shows left arm 122a, right arm 122b, and right side brace 142b respectively, extending outward from main body 112. FIG. 3A is shown from below with the bottom surface of main body 112 (bottom of cover plate 118) exposed. Cover plate 118 covers parts of left arm 122a and right arm 122b. Cover plate 118 includes an opening exposing tab 162, which may be accessed when mount 102 is not mounted on a surface to allow left arm 122a and right arm 122b to be extended. The left arm 122a and the right arm 122b are extendable and retractable out of and into respective slots in the main body 112. In accordance with certain embodiments, the left arm 122a and the right arm 122b move in concert with one another, i.e., in tandem. More specifically, in certain embodiments, manually maneuvering one of the left and right arms 122a, 122b will cause the other one of the arms to be maneuvered. For example, maneuvering the left arm 122a further out of the left slot will also cause the right arm 122b to be maneuvered further out of the right slot, and vice versa. Conversely, pushing the left arm 122a further into the left slot will also cause the right arm 122b to be pushed further into the right slot, and vice versa. This will ensure that a component (e.g., tablet and/or keyboard) that is secured to the mount 102 is centered left to right. The front side brace 142c is also movable with respect to main body 112. The maneuverability of the left and right arms 122a, 122b enables the mount 102 to be used with tablets and keyboards of various different widths. The maneuverability of the front side brace 142c and blocker tab 140 enables the mount 102 to be used with keyboards and tablet stands of various different depths. The terms maneuverability and adjustability are often used interchangeably herein.

The left side brace 142a, the right side brace 142b, and the front side brace 142c can also be referred to collectively as the side braces 142, or individually as a side brace 142. In certain embodiments one or more of the side braces 142 are adjustable. In alternative embodiments the side braces 142 are not adjustable and are configured for use with tablets and keyboards having a relatively narrow range of thicknesses.

Figure 3B:
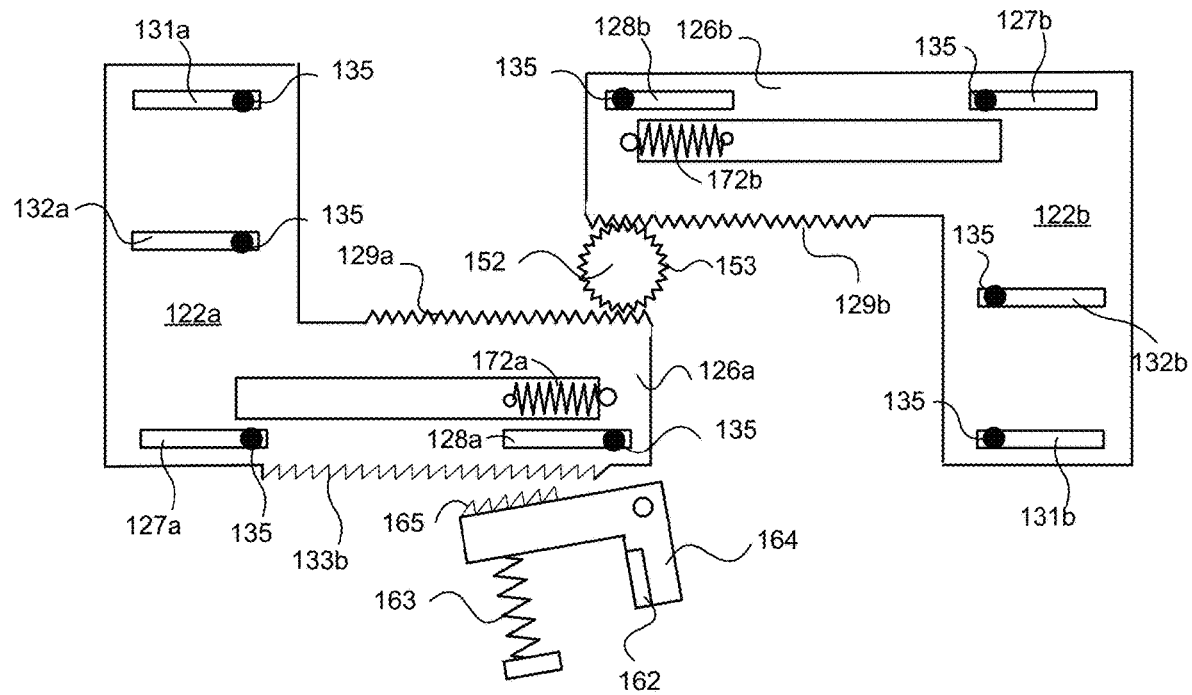
Figure 3C:
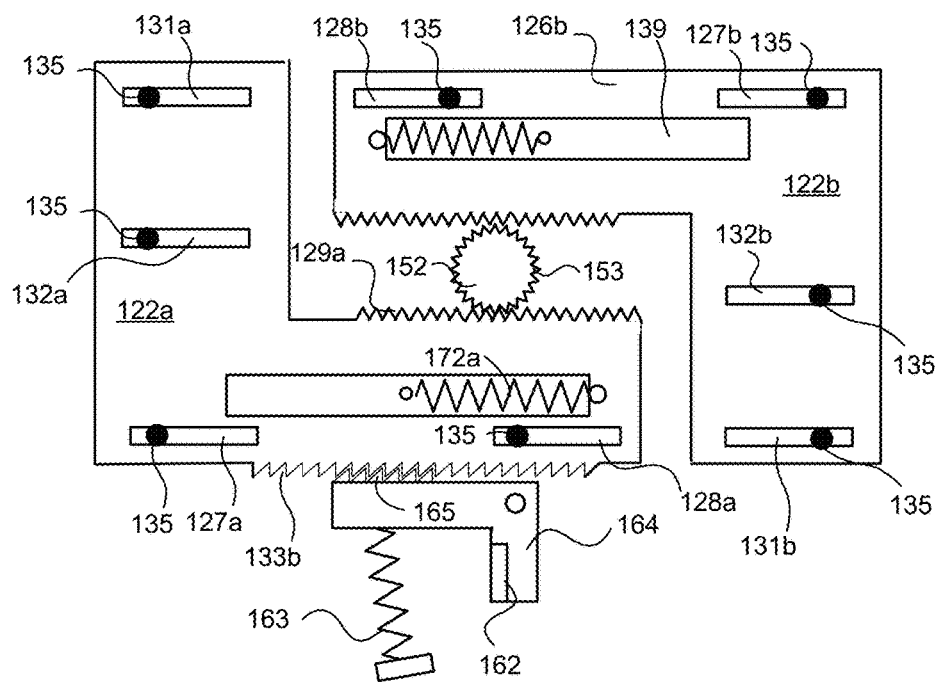

Various mechanical systems may be used to facilitate extension and retraction of left arm 122a and right arm 122b (and with them left side brace 142a and right side brace 142b). Certain examples of such systems are described in U.S. patent application Ser. No. 16/572,296, filed on Sep. 16, 2019, and published as Publication Number 2021/0059437, which is hereby incorporated by reference in its entirety. FIGS. 3B-C illustrate an example of a mechanical system for extension and retraction of arms in the extended and retracted configurations respectively, including a locking mechanism to lock arms in a retracted or partially retracted position. FIG. 3B shows a circular gear 152 that includes teeth 153 around its circumference. The toothed edge formed by the teeth 129a of the posterior appendage 126a of the left arm 122a provide a first rack gear. Similarly, the toothed edge formed by the teeth 129b of the posterior appendage 126b of the right arm 122b provide for a second rack gear. The teeth 153 of the circular gear 152 intermesh with these first and second rack gears to thereby cause the left arm 122a and the right arm 122b to move in and out relative to the main body 112 in tandem with one another.

FIGS. 3B and 3C are bottom views of components of the mount 102 with the bottom cover plate 118 of the main body 112 removed to better show how the innerworkings of the mount 102 operate. In FIG. 3B the left and right arms 122a, 122b, are in their fully extended positions. In FIG. 3C the left and right arms 122a, 122b, are in their fully retracted positions. Referring to FIGS. 3B and 3C, expansion coils of springs 172a and 172b are used to bias the left and right arms 122a, 122b in their fully extended position. More specifically, the spring 172a is fastened between a portion of the posterior appendage 126a (of the left arm 122a) and a peg or fastener that is attached to the main body 112. The spring 172b is fastened between a portion of the posterior appendage 126b (of the right arm 122b) and another peg or fastener that is attached to the main body 112. Each of the expansion springs 172a-b, which can also be referred to as extension springs 172, is used to carry an amount of tension in between its coils in order to keep them together and be used to store energy when pulled apart by a force. In FIG. 3B, where the arms 122 are in their fully extended positions, the springs 172 are in their tightly coiled normal or relaxed state wherein their coils are not stretched or expanded. So long as the arms 122 are at least partially retracted, the springs 172 will be at least partially stretched or expanded and generate an outward force on respective arms. In FIG. 3C, where the arms 122 are in their fully retracted positions, the springs 172 are in stretched or extended, and the springs 172 will attempt to return to their tightly coiled normal or relaxed state. As will be described in additional detail below, a lock mechanism prevents this from happening until a user desires this to happen, and more generally, until a user releases the lock mechanism using tab 162. In accordance with certain embodiments, in response to a lock mechanism being released while the arms are in at least partially retracted positions (e.g., because the mount 102 was being used to secure a tablet thereto), energy stored by the springs 172 will cause the arms to automatically move to their fully extended positions.

As can be seen in FIGS. 3B and 3C, some of the pegs 135 or fasteners that are attached to the main body extend through various channels (e.g., channels 127a, 128a, 131a, 132a, 127b, 128b, 131b, 132b) within the arms 122a, 122b, to act as guides for the arms 122, and maintain proper alignment of the arms 122 relative to the main body 112 and one another.

Referring to FIGS. 3B and 3C, elements of a lock mechanism include a pawl 164 and a spring 163. The pawl 164 is pivotable about a pivot point (provided by a peg or fastener) and includes teeth 165 that are configured to be selectively engaged with teeth 133b on left arm 122a, to thereby selectively lock the left arm 122a in place. Since the left and right arms 122a and 122b move in tandem due to the gear 152, as explained above, when the left arm 122a is locked in place the right arm 122b is also locked in place.

The pawl 164 is maneuverable, e.g., rotatable by a finger of a user against tab 162, into either a lock position or a release position. When the pawl 164 is in its lock position (as shown in FIG. 3C) the teeth 165 intermesh with the teeth 133b of the left arm 122a to thereby lock all the arms 122a, 122b, in place (e.g., after a tablet and keyboard have been secured to the main body 112 of the mount 102). Spring 163 biases pawl 164 to maintain pawl 164 in the lock position. When the pawl is rotated to the release position (as shown in FIG. 3B) the teeth 165 are moved away from the teeth 133b of the left arm 122a to thereby release all the arms 122a, 122b and causing arms 122 to extend outward due to force exerted by springs 172. This may allow removal of a tablet and keyboard that had been secured to the main body 112 of the mount 102. Returning arms from the extended position to an at least partially retracted position (e.g., to secure a tablet and keyboard) does not require rotation of pawl 164 by a user. Teeth 165 and 133b have engaging surfaces that allow arms to ratchet inwards but prevent arms from extending without manual intervention (e.g., ratchet formed by teeth 165 and 133b allow only inward movement). In this way, a tablet and keyboard may be secured without access to tab 162 (e.g., with mount 102 bolted to a surface) if arms are initially extended. Because arms 122a, 122b are ratcheted and spring-loaded, configuration and adjustment for different sized components may be easily achieved without specialized tools.

Figure 3D:
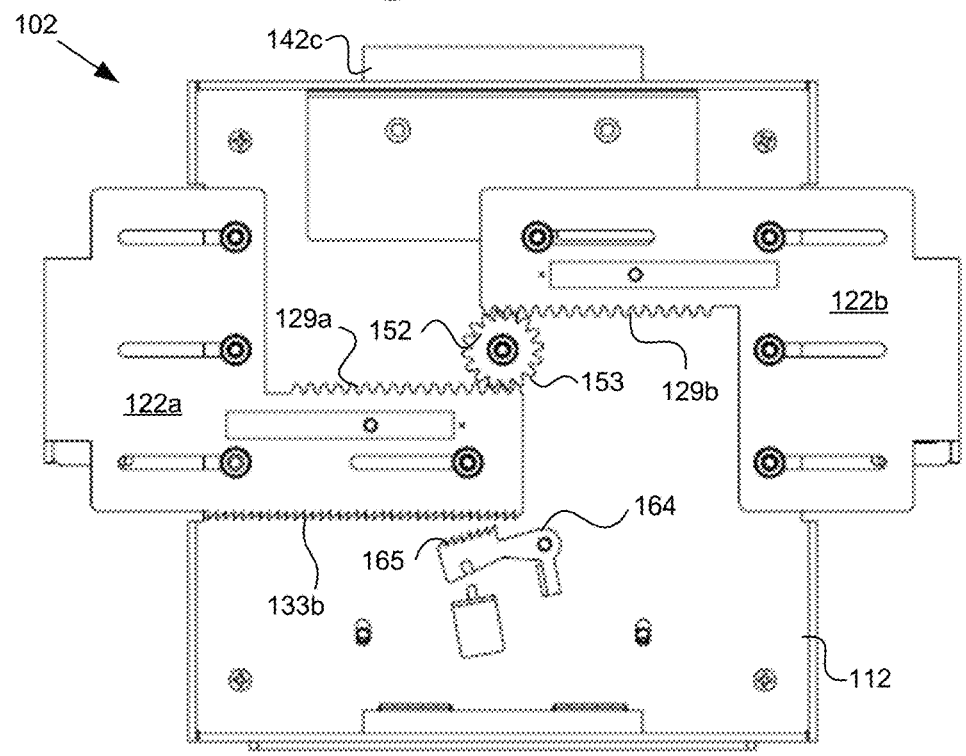
Figure 3E:
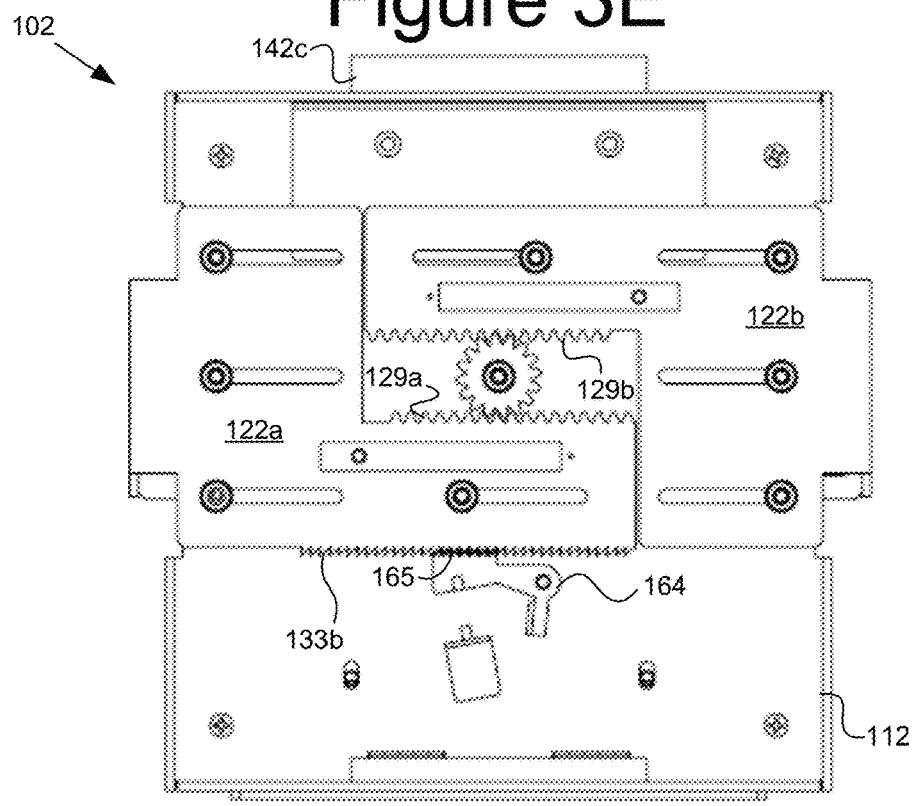

FIGS. 3D-E illustrate additional features of mount 102 with cover plate 118 removed to show arms 122a, 122b in the extended and retracted positions with respect to main body 112. FIG. 3D shows how arms 122a, 122b extend outward of main body 112 in the extended position. Circular gear 152 engages teeth 129a, 129b to ensure that arms 122a, 122b extend equally on either side of main body 112. Pawl 164 is rotated to allow full extension in this illustration. Front side brace 142c can also be seen from below in this perspective.

FIG. 3E shows arms 122a, 122b with pawl 164 locking arms 122a, 122b in the retracted position (teeth 165 of pawl 164 engaging teeth 133b of left side arm 122a). Arms 122a, 122b may be moved together from the extended position of FIGS. 3B and 3D to the retracted position of FIGS. 3C and 3E by pushing in on arms 122a, 122b. Arms 122a, 122b may be moved together from the retracted position of FIGS. 3C and 3E to the extended position of FIGS. 3B and 3D by disengaging pawl 164 to allow spring loaded arms 122a, 122b to return to the extended position.

In addition to left and right arms 122a, 122b, mount 102 includes top arm 136, which is also extendable and retractable in a similar manner to arms 122a-b to facilitate securing a tablet (e.g., by allowing top brace 138 to engage a top edge of a tablet).

Figure 4A:
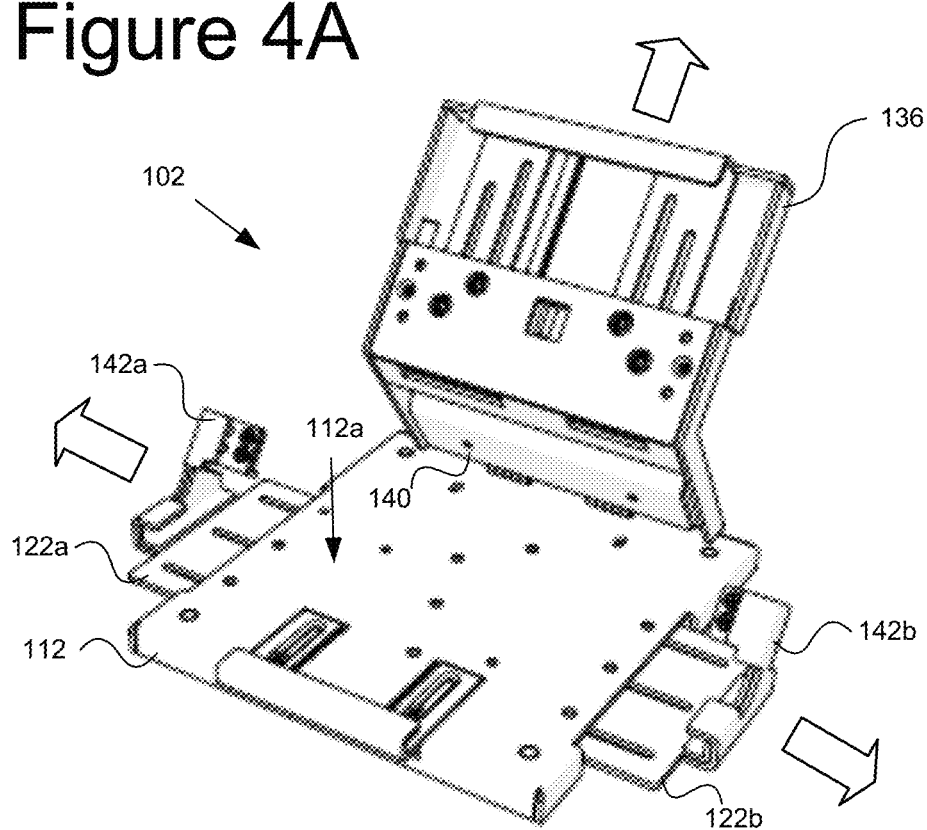
Figure 4B:
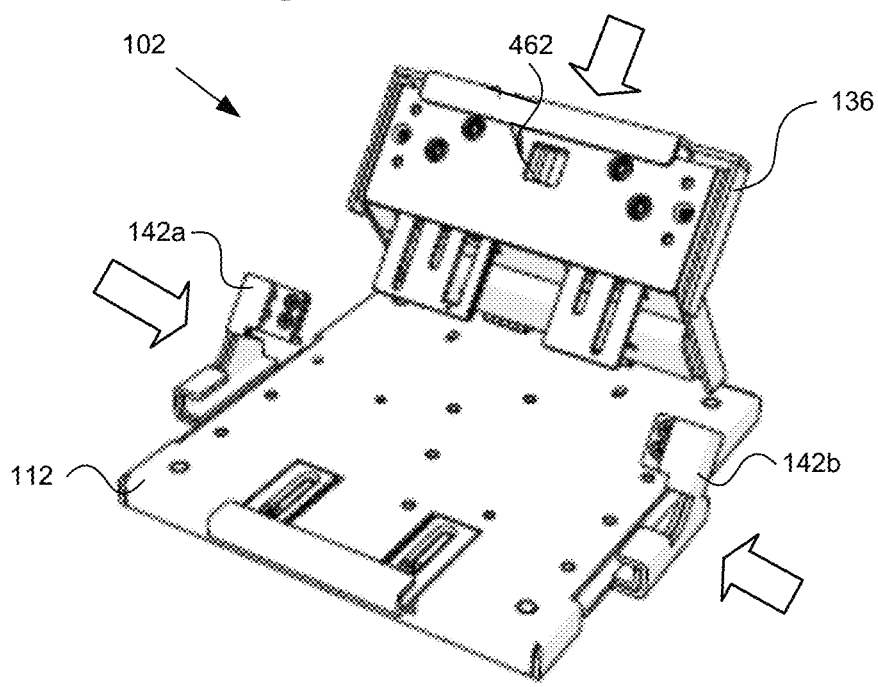

FIG. 4A shows an example of mount 102 with both left and right arms 122a-b extended (as in FIG. 3B) and with top arm 136 also extended (e.g., in an open or load position to allow loading of components such as a tablet, keyboard, and tablet stand. Blocker tab 140 is raised leaving the upper surface 112a of main body 112 open. In contrast, FIG. 4B shows mount 102 with left and right arms retracted into main body 112 (and therefore not visible) and with top arm 136 also retracted (e.g., in a closed or locked position to secure components previously loaded). Top arm 136 may extend and retract using a suitable mechanism, for example, a second lock mechanism similar to the first lock mechanism used for left and right arms 122a-b (example illustrated in FIGS. 3B-C) or otherwise. FIG. 4B shows a tab 462 that may be used to release top arm 136 so that it extends.

Figure 4H:
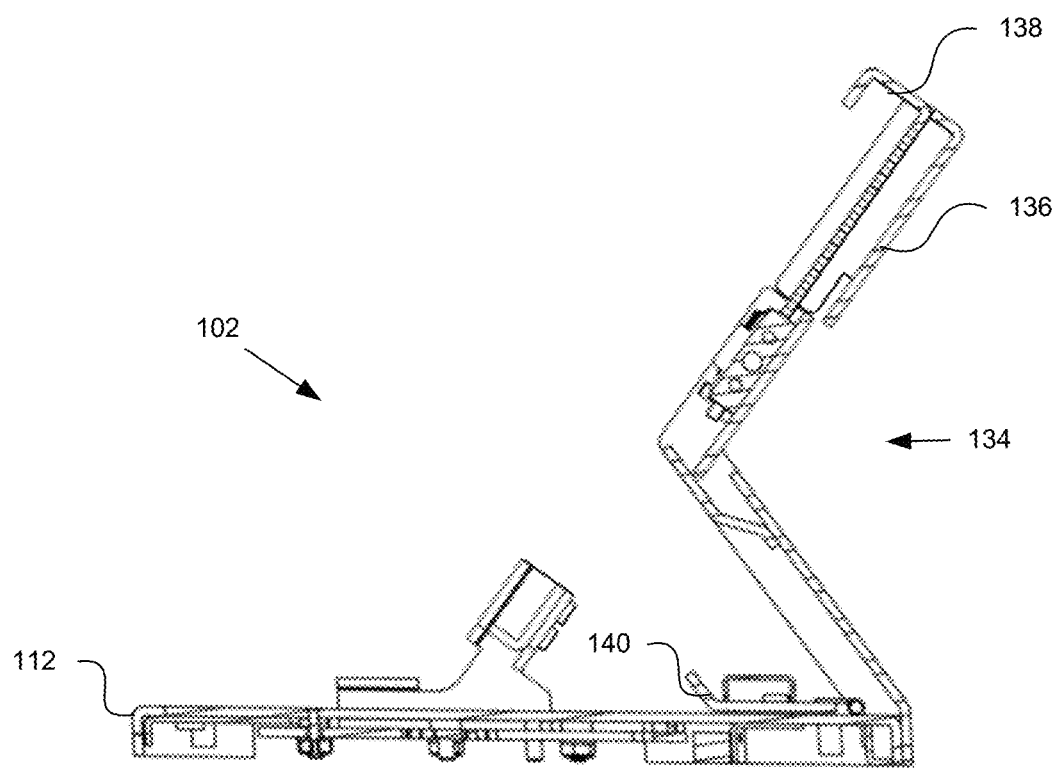
Figure 4I:
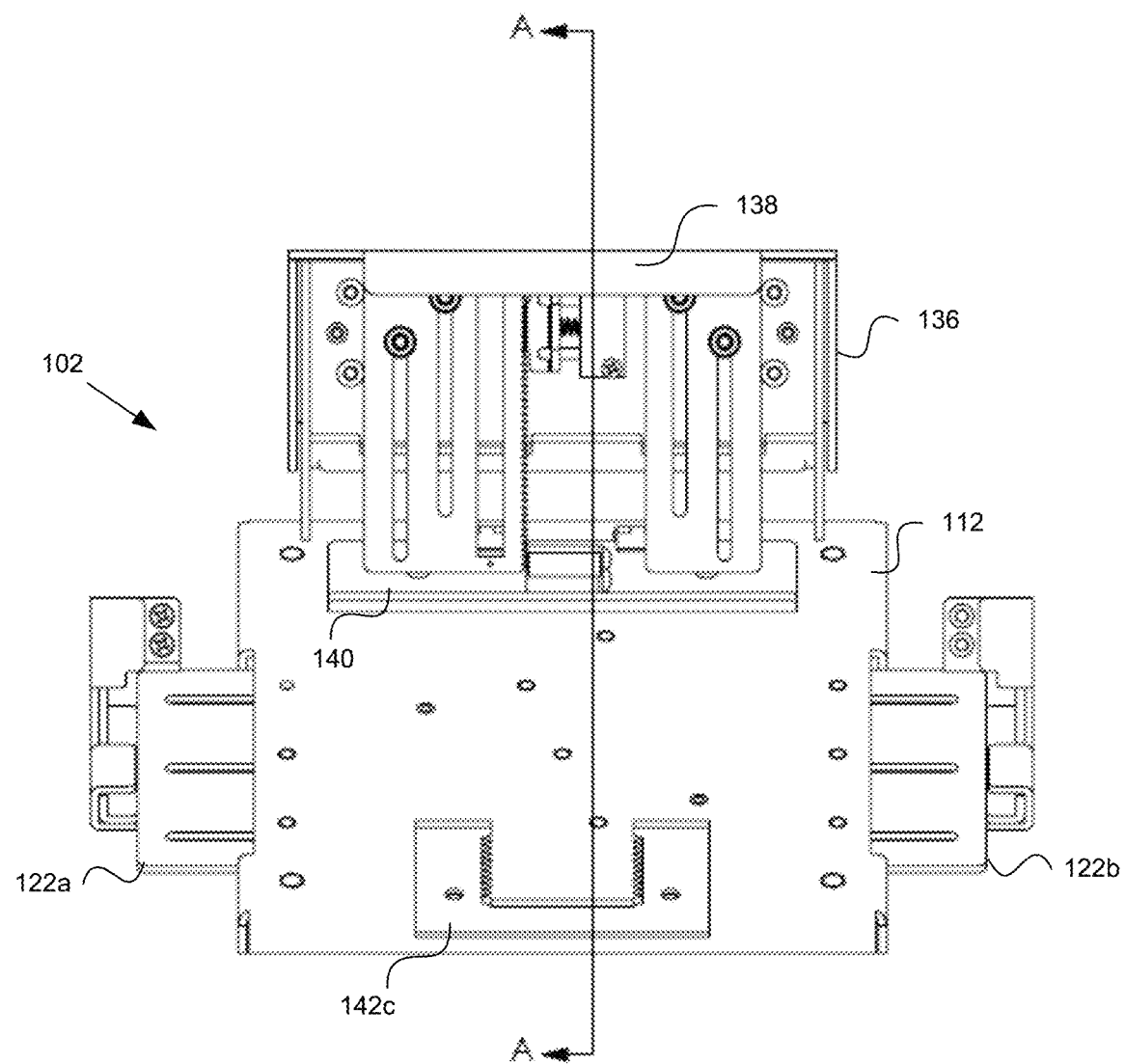
Figure 4J:
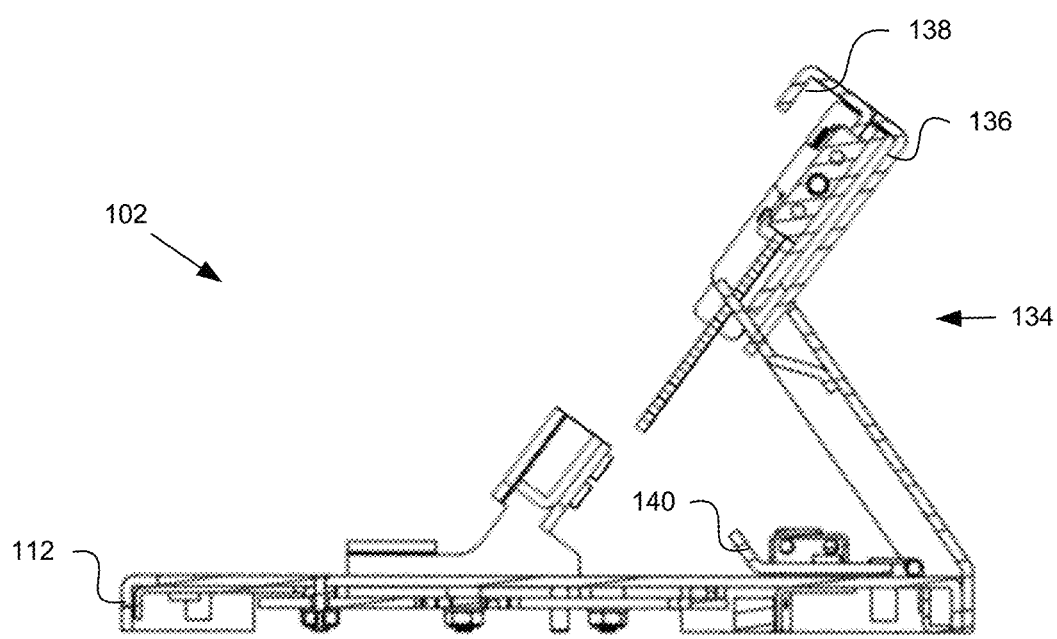

FIGS. 4C-J show an example of operation of a mechanism for extension and retraction of top arm 136 and top brace 138. FIGS. 4C-D show top arm 136 in an extended position (as in FIG. 4A) in front view and cross-sectional view respectively, with cover plate 134d removed to better show the inner workings. FIGS. 4E-F show top arm 136 in a retraced position (as in FIG. 4B) in front view and cross-sectional view respectively. FIGS. 4G-H show mount 102 including top arm 136 in the extended position in front view and cross-sectional view respectively. FIGS. 4I-J show top mount 102 including top arm 136 in the retracted position in front view and cross-sectional view respectively.

Referring to FIG. 4C, coil spring 172c is used to bias top arm 136 in its fully extended position. More specifically, spring 172c is fastened between a portion of left appendage 402 of top arm 136 and a peg or fastener that is attached to upper portion 134b of back support 134. Spring 173c is used to carry an amount of tension when coils are pulled apart by a force. So long as top arm 136 is at least partially retracted with respect to upper portion 134b, spring 173c will be at least partially stretched or expanded and generate an upward force on top arm 136. In FIGS. 4E-F, where top arm 136 is in its fully retracted position, spring 172c is stretched or extended and will attempt to return to its tightly coiled normal or relaxed state. A lock mechanism prevents this from happening until a user desires this to happen, and more generally, until a user releases the lock mechanism using tab 462. In accordance with certain embodiments, in response to a lock mechanism being released while top arm 136 is in an at least partially retracted position (e.g., because mount 102 was being used to secure a tablet thereto), energy stored by spring 172c will cause top arm to automatically move to its fully extended position.

As can be seen in FIGS. 4C-F, some pegs 135 or fasteners that are attached to upper portion 134b extend through various channels in top arm 136 to act as guides for top arm 136 and maintain proper alignment of top arm 136. For example, channels 404 and 406 in left appendage 402 and slots 408 and 410 in right appendage 412 each have a respective peg 135 extending through them to provide alignment. In addition, bushings 414 extending from upper portion 134b provide additional guiding and alignment by engaging outer edges of left appendage 402 and right appendage 412 as top arm 136 extends and retracts.

Referring to FIGS. 4C and 4E, elements of a lock mechanism include a pawl 420 and a spring 422. Pawl 420 is slidable along direction of travel (laterally, in FIGS. 4C and 4E) and includes teeth 424 that are configured to be selectively engaged with teeth 426 on left appendage 402, to thereby lock top arm 136 in place. Guide pins 428 extend from pawl 420, through holes in block 431, which is attached to upper portion 134b to constrain travel of pawl 420 to straight-line travel in a direction perpendicular to teeth 426.

Pawl 420 is maneuverable, e.g., slidable by a finger of a user against tab 462, into either a lock position or a release position. When pawl 164 is in its lock position (as shown in FIG. 4F) teeth 424 intermesh with teeth 426 to thereby lock to top arm 136 in place (e.g., after a tablet and keyboard have been secured to back support 134 of mount 102). Spring 422 biases pawl 420 to maintain pawl 420 in the lock position. When pawl 420 is withdrawn to the release position, the teeth 424 are moved away from teeth 426 to thereby release top arm 136 and cause top arm 136 to extend upward due to force exerted by spring 172c. Returning top arm from the extended position to an at least partially retracted position (e.g., to secure a tablet) does not require sliding pawl 420. Teeth 424 and 426 have engaging surfaces that allow top arm 136 to ratchet downwards but prevent top arm 136 from extending upward without manual intervention. In this way, a tablet may be secured without access to tab 462 (e.g., with a tablet on back support surface 136c obscuring tab 462) but cannot be released without manual intervention. Releasing top arm 136 requires access to tab 462 and cannot be performed with a tablet in place. Because top arm 136 (like left and right arms 122a, 122b) is ratcheted and spring-loaded, configuration and adjustment for different sized components may be easily achieved without specialized tools.

While pawl 420 slides in a straight-line and pawl 164 rotates, these are examples and are not intended to be limiting (e.g., both pawls could be rotating or sliding, or some other locking mechanism could be used at one or both locations.

FIG. 4D, which is a side view of top arm 136, shows additional features of top arm 136 that are not visible in the front view of FIG. 4C. FIG. 4D shows that top brace 138 is hook-shaped in cross-section along a vertical plane and also shows protective plate 430 that extends behind appendages 402 and 412 to protect appendages and the locking mechanism, including pawl 420 and spring 422, and thereby prevent unauthorized access that might allow top arm 136 to be released. Protective plate 430 extends down so that even with top arm 136 in the extended position, there is no significant gap between protective plate 430 and upper portion 134b and, as shown in FIG. 4F, there is significant overlap between these elements when top arm 136 is retracted. FIG. 4F shows top arm 136 in the retracted position in the same view as FIG. 4D.

Front side brace 142c is adjustable using sets of interlocking teeth. Unlike left and right side braces 142a, 142b, and top brace 138, in the embodiment shown front side brace 142c is not attached to a spring-loaded arm with locking mechanism. In an alternative embodiment, which is not shown, front side brace 142 can also be attached to a spring loaded arm with locking mechanism. As previously illustrated in FIG. 2C, front side brace 142c may be unscrewed from main body 112 for adjustment.

FIGS. 4G-H show mount 102 with top arm 136 in the extended position (corresponding to FIGS. 4C-D) with respect to main body 112. Arms 122a, 122b are shown in the extended position also (e.g., for loading a tablet, keyboard, and tablet stand). Front side brace 142c is also shown (may be adjusted prior to loading components). Blocker tab 142 is shown in the down position.

FIG. 4H shows a cross-sectional view of mount 102 along A-A of FIG. 4G including main body 112, back support 134, top arm 136, top brace 138, and blocker plate 140.

FIGS. 4I-J show mount 102 with top arm 136 in the retracted position (corresponding to FIGS. 4E-F) with respect to main body 112. For example, top arm 136 may be pushed from the extended position to the retracted position to lock a tablet in place.

FIG. 4J shows a cross-sectional view of mount 102 along A-A of FIG. 4I including main body 112, back support 134, top arm 136, and blocker plate 140.

Figure 5A:
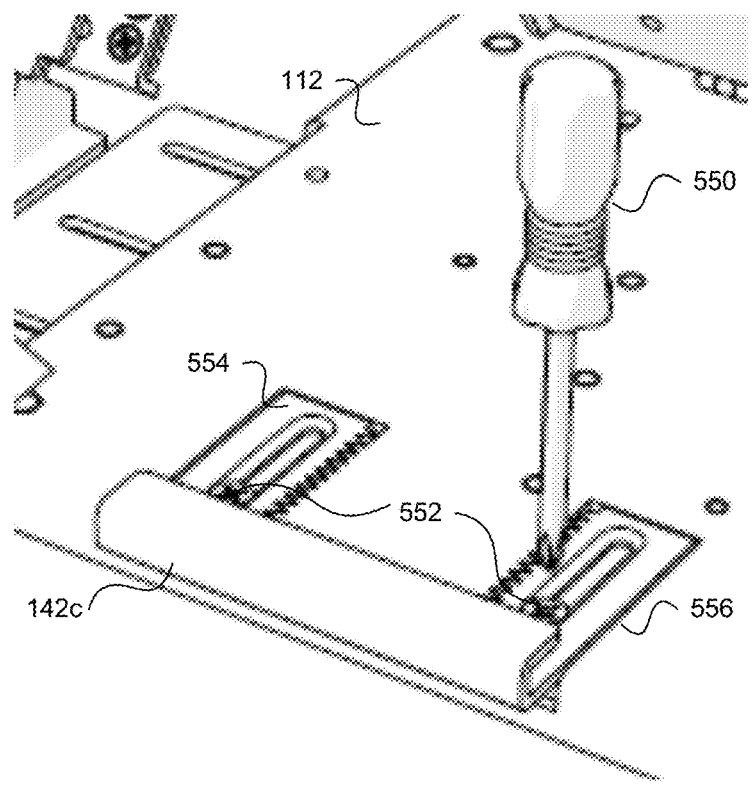
FIGS. 5A-B illustrate examples of a configurable front side brace of an adjustable mount.

FIG. 5A shows front side brace 142c retracted to hold a relatively small keyboard or keyboard/tablet stand combination. Screws 552 hold left side appendage 554 and right side appendage 556 in corresponding cutouts in the upper surface 112a of main body 112 so that indentations along sides of left and right side appendages 554 and 556 engage corresponding indentations along sides of cutouts. Screwdriver 550 may be used to loosen or remove screws 552, thereby allowing front side brace 142c to be lifted and adjusted so that the front slot formed by front side brace 142c secures the front edge of the keyboard.

Figure 5B:
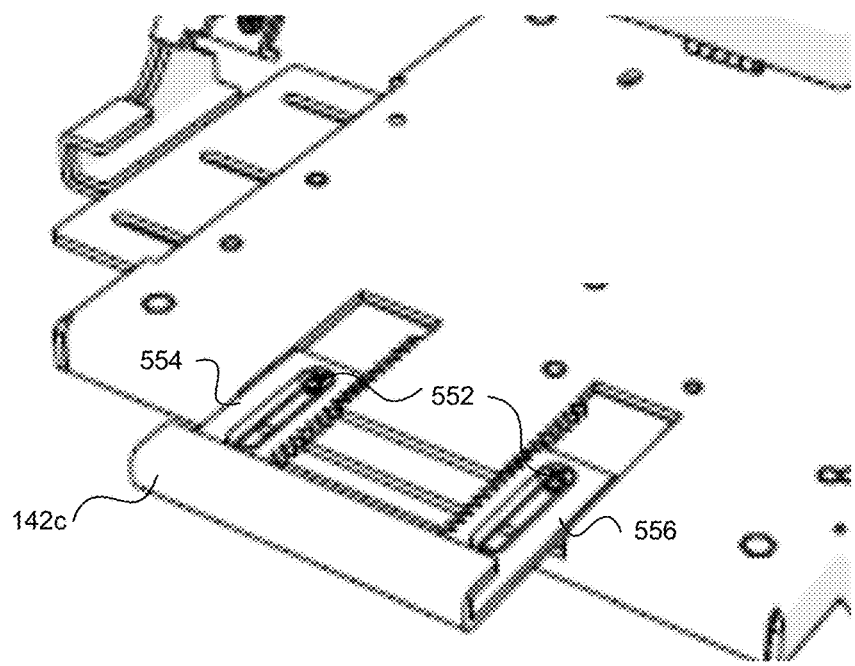

FIG. 5B shows front side brace 142c extended to hold a relatively large keyboard or keyboard/tablet stand combination. Front side brace 142c may be adjusted by loosening screws 552, raising front side brace 142c, and extending or retracting it. Front side brace is configurable to extend different distances from the front wall of the main body to accommodate keyboards of different sizes. For example, a larger keyboard may extend out beyond the front wall of main body 112 with front side brace 142c configured as shown.

Left and right side braces 142a, 142b may be configured to hold both a keyboard and a tablet when corresponding left and right arms 122a, 122b are retracted. For example, each side brace may form two slots, a lower slot (which may extend substantially parallel to main body 112) to hold a side or edge of a keyboard and an upper slot (which may extend where a tablet is to be located, e.g., along a plane that intersects main body 112 at an obtuse angle and is parallel to back support surface 136c so that a tablet lying along back support surface 136c lies within the upper slot.

Figure 6A:
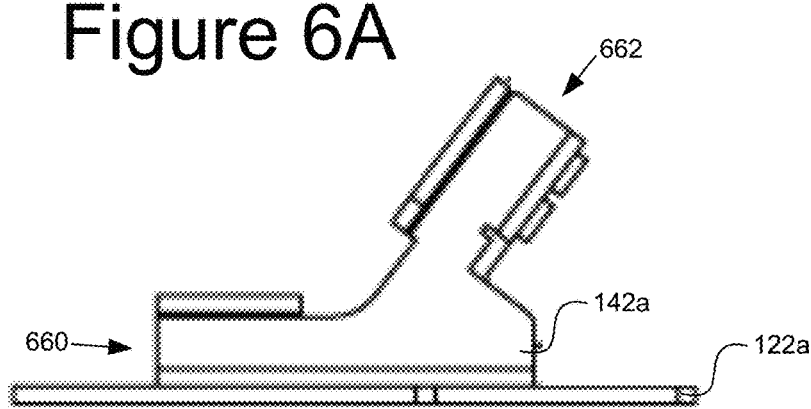
FIGS. 6A-D illustrate examples of configurable side braces of an adjustable mount.

FIG. 6A shows left side brace 142a attached to left arm 122a in side view. A lower slot 660 extends parallel to left arm 122a (and parallel to main body 112) to hold a keyboard while an upper slot 662 extends at an oblique angle with respect to lower slot 660 (oblique angle with respect to arm 122a and main body 112) to hold a tablet. Left side brace 142a may be formed integrally with left arm 122a (e.g., welded together) or may be separable (e.g., bolted or screwed in a secure manner).

Different brace configurations may be used to accommodate different keyboard/tablet/support combinations. For example, in some configurations, a lower edge of a tablet may lie close to, or in contact with, a rear edge of a keyboard (e.g., as shown in FIG. 1) while in other configurations, a lower edge of a tablet may be displaced vertically so that there is some gap between the rear edge of the keyboard (and upper surface 112a of main body 112) and the lower edge of the tablet. Adjustable brace features may accommodate these and other configurations. For example, a removable clip (e.g., 664, discussed below) may be used to either close the lower end of upper slot 662 to capture a lower corner of a tablet above main body 112 in a first configuration or leave upper slot 662 open down to main body 112 in a second configuration.

Figure 6B:
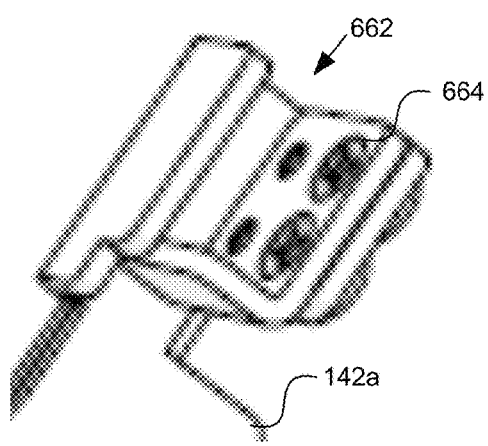

FIG. 6B shows an L-shaped clip 664 attached to left side brace 142a in a first configuration to block upper slot 662 and hold the lower edge (lower corners) of a tablet at a predetermined height above main body 112 (e.g., a height corresponding to a particular tablet stand that is to be used with a tablet in a retail display). In this configuration, left side brace 142a (and right side brace 142b, which may be similarly configured) hold lower corners of a tablet.

Figure 6C:
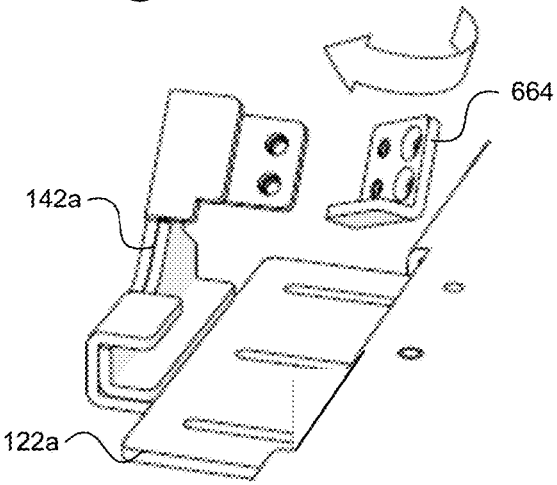

FIG. 6C shows rotation of clip 664 to change configuration by unblocking upper slot 662. Clip 664 may be unscrewed from left side brace 142a and rotated as illustrated and screwed back in place in a reversed orientation compared with FIG. 6B. While omitting clip 664 is also possible, reducing gaps between displayed components and features of mount 102 generally reduces risk of a thief inserting tools that might be used to damage or pry components.

Figure 6D:
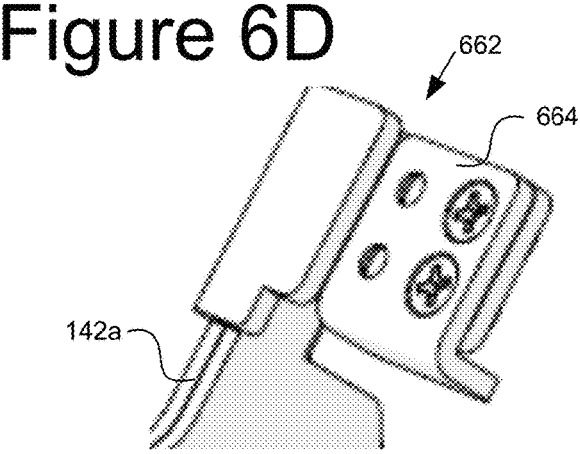

FIG. 6D shows clip 664 attached in a second configuration so that upper slot 662 is open and a tablet can extend down to main body 112. In this configuration, left and right side braces 142a, 142b hold edges of a tablet (not corners).

Blocker tab 140 may be configurable to have different configurations to accommodate tablet stands of different sizes. The example presented here has two configurations: in a first configuration blocker tab 140 blocks a portion of the upper surface of main body 112 (e.g., as shown in FIG. 2A) and in a second configuration blocker tab 140 leaves the top surface of main body 112 open (e.g., as shown in FIG. 4A).

Figure 7A:
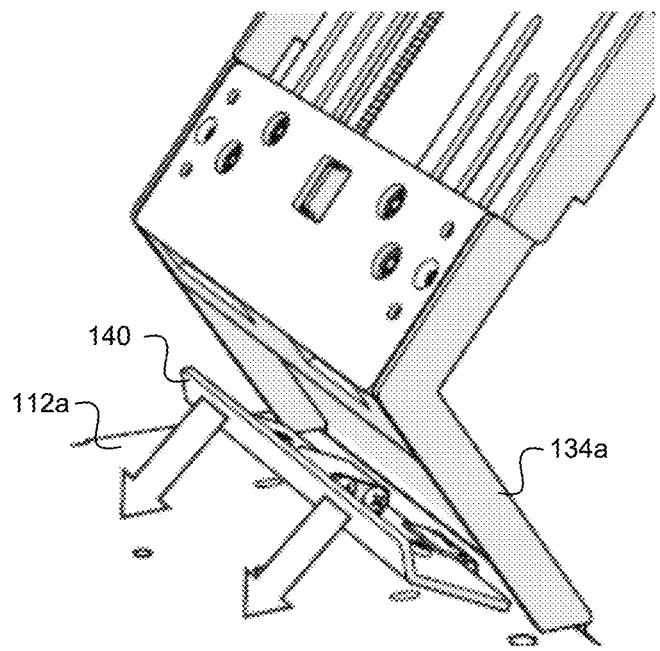
FIGS. 7A-B illustrate a configurable blocker tab of an adjustable mount.

FIG. 7A shows an example of blocker tab 140 being reconfigured from the second position, in which it is retained within lower portion 134a of back support 134, into the first position, in which it occupies a portion of upper surface of main body 112. Blocker tab 140 may be maintained in the second position by any suitable mechanism, for example, a magnet, clip or other such feature so that it stays in the second position and can be easily rotated down into the first position when desired. Blocker tab 140 is hinged about an axis that extends along the top of main body 112 where lower portion 134a extends from the main body so that blocker tab 140 is configurable to block a portion of upper surface 112a of main body 112.

Figure 7B:
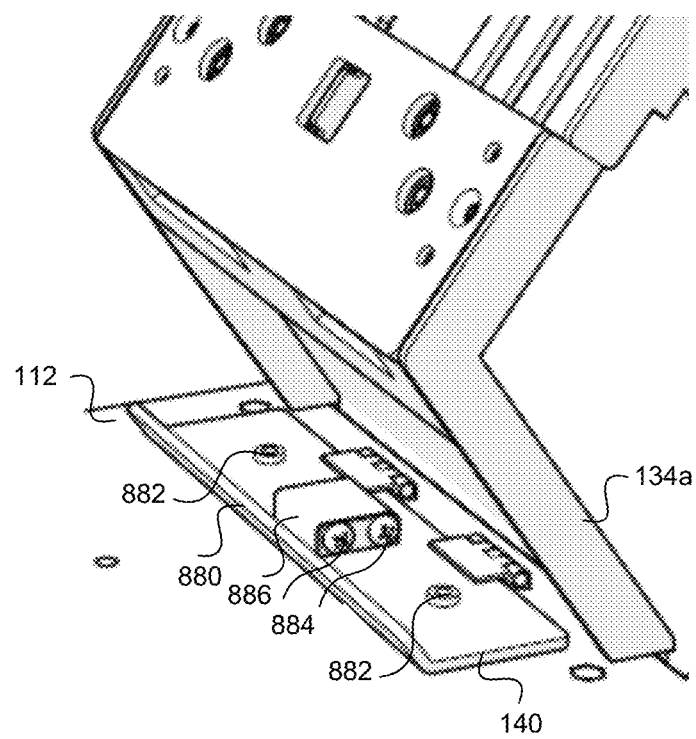

FIG. 7B shows blocker tab 140 in the first position, lying along the upper surface of main body 112. Blocker tab 140 includes a flange 880 that is located to block a tablet stand and prevent it from being pushed backward (e.g., to prevent release of a keyboard from front side brace 142c. Blocker tab 140 includes threaded holes 882 to allow blocker tab 140 to be screwed to main body 112. Screws 884 are provided in housing 886 for this purpose. Screws may be screwed into threaded holes 882 from below so that the screws are inaccessible when mount 102 is attached to a surface. Housing 886 may also contain a magnet to maintain blocker tab 140 in the second (raised) position by attaching it to lower portion 134a. The two configurations may be used to accommodate different sized and/or types of tablet stands according to their horizontal extent. For example, blocker tab 140 may be in the lower configuration (as in FIG. 7B) to accommodate a tablet stand with a relatively small horizontal extent and may be in the upper configuration to accommodate a tablet stand with a relatively large horizontal extent. Other blocker plate arrangements (e.g., with more than two possible configurations) may also be used to accommodate a range of different tablet stands.

Figure 8A:
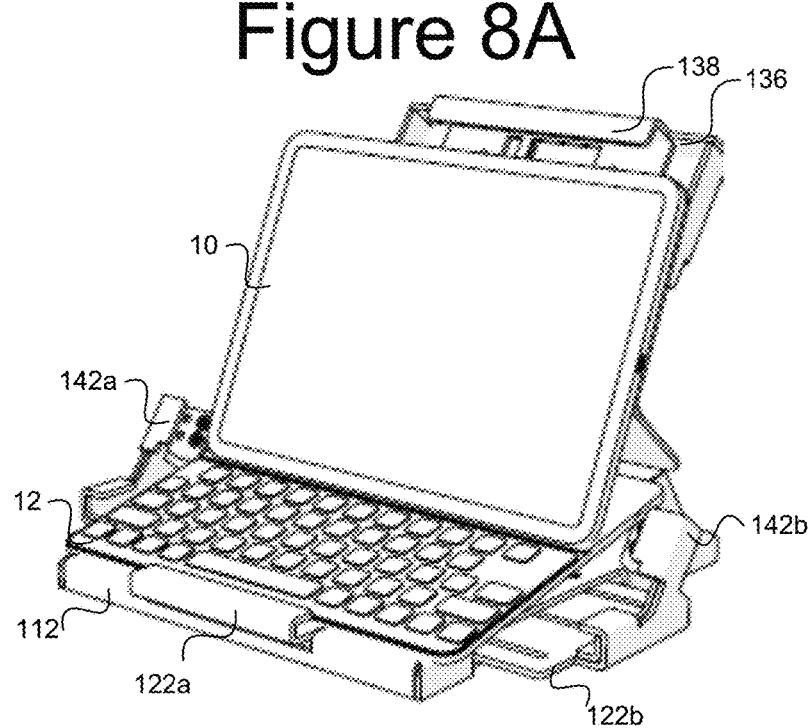
FIGS. 8A-D illustrate an example of insertion of a tablet, tablet stand, and keyboard in an adjustable mount.
Figure 8B:
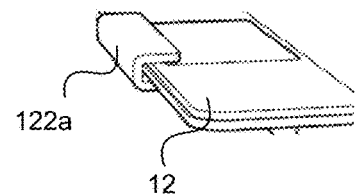

FIG. 8A illustrates how a tablet 10, keyboard 12 connected to tablet 10, and tablet stand 14 (deployed to support the tablet) can be placed on the security mount 102 when the left, right, and top arms of the security mount 102 are in extended positions (e.g., as shown in FIG. 4A). Left, right, and top braces 142a, 142b and 138 are clear of tablet 10 and keyboard 12 in this configuration to allow keyboard 12 to be placed on main body 112 and the front edge of keyboard 12 to be slid under front side brace 142c as shown in FIG. 8B.

Figure 8C:
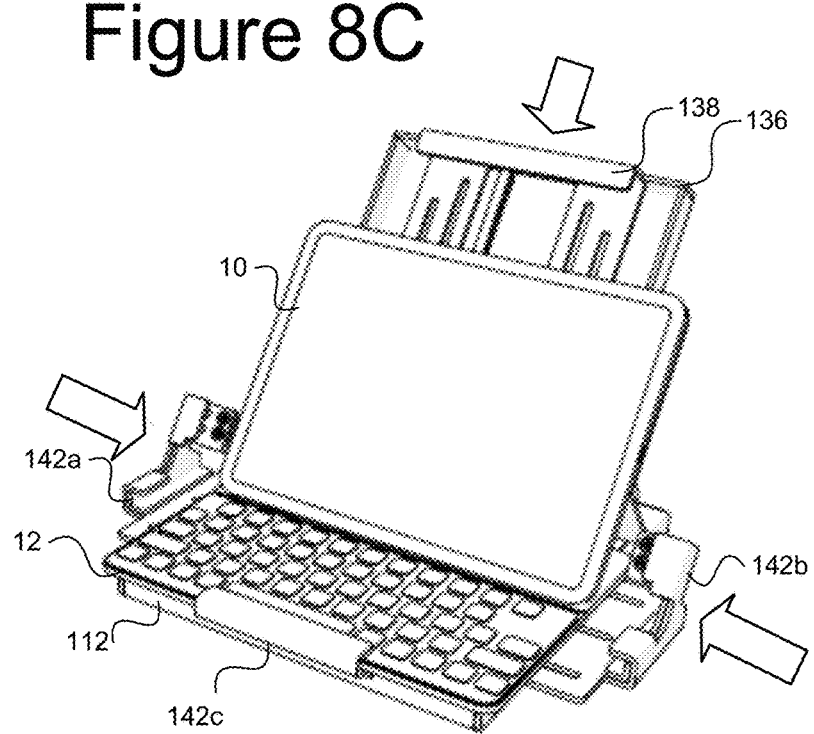
Figure 8D:
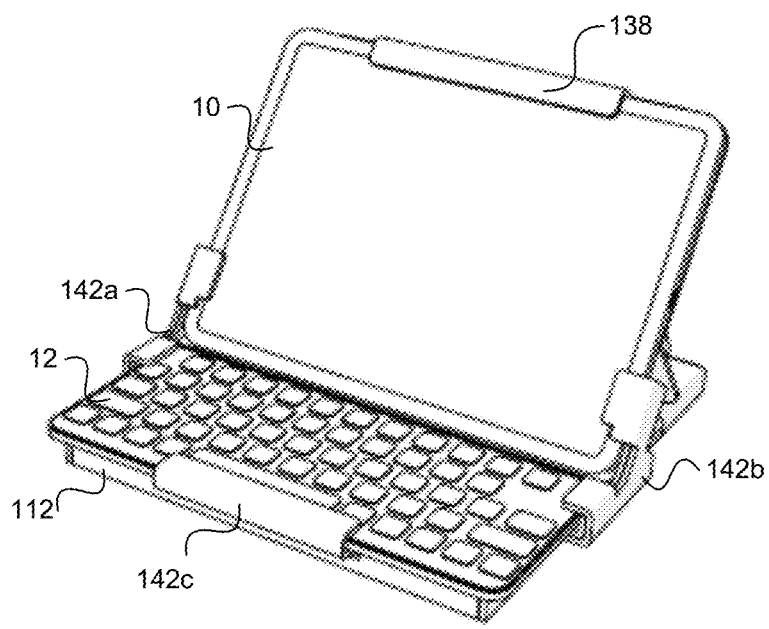

With tablet 10, keyboard 12 and tablet stand 14 in place, left and right arms 122a, 122b, and top arm 136 may be retracted by pushing them inwards as illustrated in FIG. 8C (ratcheted to allow retraction but not extension) so that left side brace 142a, right side brace 142b engage the sides of tablet 10 and sides of keyboard 12 and top brace 138 engages the top edge of tablet 10. FIG. 8D shows the result of this retraction with tablet 10 and keyboard 12 held by left and right side braces 142a, 142b, front side brace 142c and top brace 138. With main body 112 bolted to a table or other surface, these braces cannot be extended and tablet 10 and keyboard 12 cannot be released.

Each of the elements of the security mount 102 are preferably made of a strong metal or alloy (aka metal/alloy) so that the security mount 102 is sturdy and cannot be readily bent, cut through, or otherwise broken or tempered with. For example, such elements can be made of steel. Different elements of the security mount 102 can be made of the same metal/alloy or different metals/alloys than other elements. All or subsets of such elements can be painted, powder coated, or otherwise covered to have any desired color and appearance. Certain elements of the security mount 102 can be molded, cast and/or machined. Certain elements of the security mount 102, such as the arms 122, cover plates 134d, 118, and side braces 142 that are fixed in height, can be made from blanks that are cut (e.g., laser cut or mechanically cut) or stamped from a sheet of metal/alloy, and then bent if appropriate into a desired final configuration. It would also be possible that certain elements, such as cover plates 134d, 118 be made of a strong plastic, since they won't be accessible while the mount 102 is securing components to a display surface.

Figure 9:
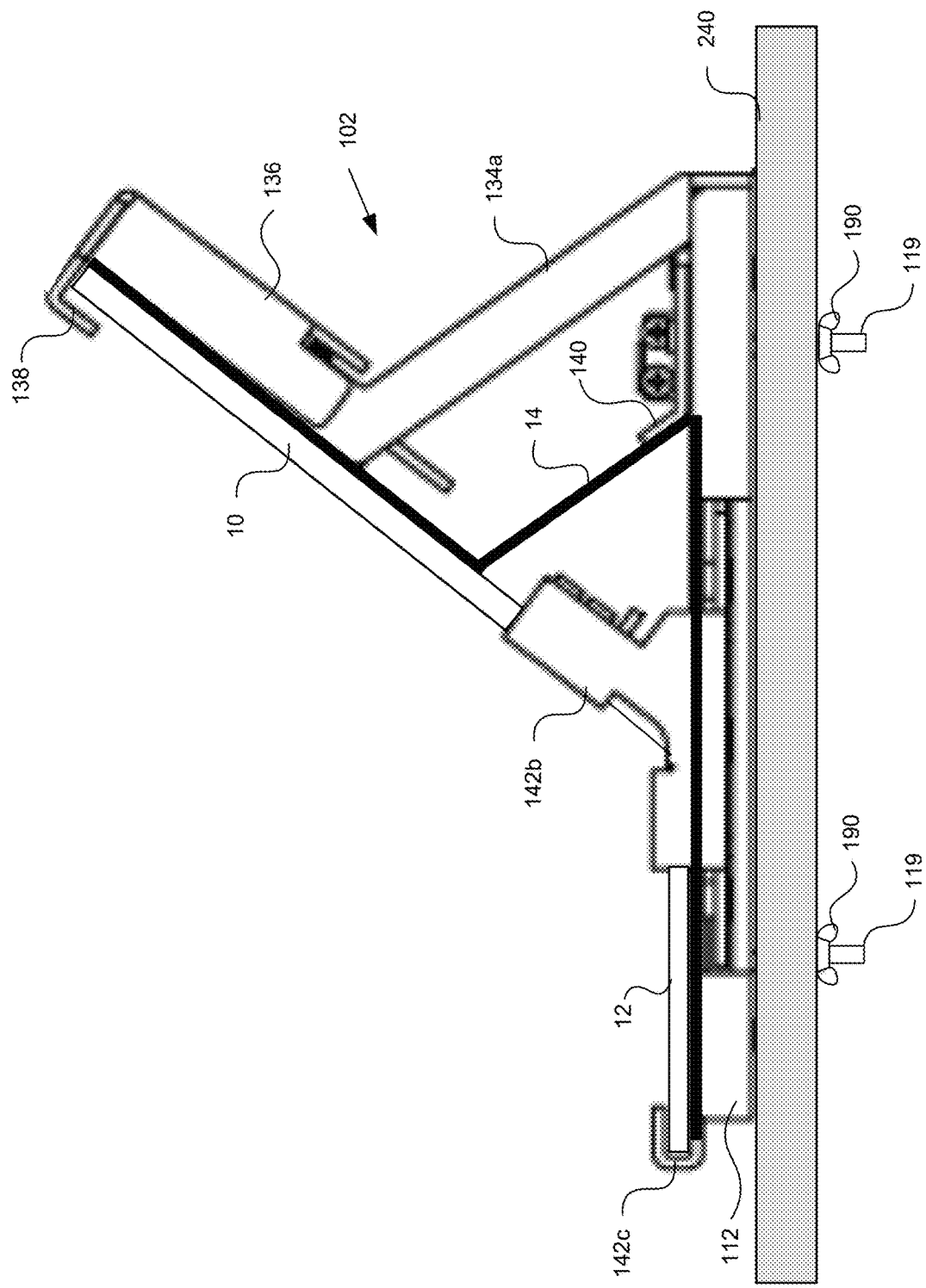
FIG. 9 illustrates an example of an adjustable mount attached to a surface to secure a tablet, keyboard, and tablet stand.

FIG. 9, which includes a side view of the mount 102 with tablet 10, keyboard 12, and tablet stand 14 secured to the mount 102, shows how the mount 102 can be secured to a tabletop 240 of a display table. More specifically, fasteners 119 that extend downward from the main body 112 of the mount 102, can be inserted through respective through-holes in the tabletop 240. As can best be seen in FIG. 9, nuts 190 (e.g., wingnuts) and/or other fastener hardware can then be used to secure the main body 112 of the mount 102 to the tabletop 240 of a display table from the underside of the tabletop 240. Preferably, the underside of the tabletop 240 is made inaccessible to customers and potential thieves in a retail store, e.g., by being encased in a locked enclosure. This way potential thieves cannot remove the security mount 102 from the display table, and thus, components that are secured to the display table by the security mount 102.

The security mounts of the embodiments of the present technology can be used to secure one or more of a tablet, keyboard, and tablet stand to other display surfaces besides a horizontal display table. For example, such apparatuses can also be used to secure components to a vertical display wall, if desired, or more generally, to any one of various different types of display surfaces. As could be appreciated from the above discussion, because of the adjustability of the security mount 102 it can beneficially be used with tablets, keyboards, and tablet stands of various different dimensions, including various different widths, depths, and thicknesses. Security mount 102 is extremely versatile and may also be used to secure other components or combinations of components including, for example, a tablet without a keyboard and/or tablet stand, a laptop, or other component(s). For example, while security mount 102 accommodates various tablet stands, it may also accommodate a tablet and keyboard without a tablet stand, or a tablet alone.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, without additional context, use of numerical terms such as a "first" object, a "second" object, and a "third" object may not imply an ordering of objects, but may instead be used for identification purposes to identify different objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus for physically securing a tablet and a keyboard to a tabletop of a display table or to another display surface, comprising:
   a main body having a top, a bottom, and walls that extend between the top and the bottom;
   a left slot and a right slot in left and right walls respectively of the main body;
   a left arm and a right arm that extend respectively through the left slot and the right slot, the left and right arms are extendable and retractable relative to the main body;
   a left side brace and a right side brace attached respectively to the left arm and the right arm, and configured to be secured to a left side and a right side, respectively, of each of the tablet and the keyboard;
   a front side brace extending from a front wall of the main body;
   a back support extending from the top of the main body;
   a top arm extending from the back support, the top arm is extendable and retractable relative to the back support along a plane that intersects the top of the main body at an oblique angle; and
   a plurality of fasteners that extend downward from the bottom of the main body and are attachable to a tabletop of a display table or to another display surface to thereby secure the main body to the tabletop or other display surface.

2. The apparatus of claim 1, further comprising:
   a first lock mechanism configured lock the left and right arms in place after they have been at least partially retracted to thereby secure sides of the keyboard and the tablet to the main body; and
   the first lock mechanism also configured to allow a user to selectively release the left and right arms to thereby enable the left and right arms to be extended to thereby allow the keyboard to be unsecured from the main body.

3. The apparatus of claim 2, further comprising:
   a second lock mechanism configured to lock the top arm in place in an at least partially retracted position to thereby secure a top edge of the tablet to the back support; and
   the second lock mechanism also configured to allow a user to selectively release the top arm to thereby enable the top arm to be extended and enable the top edge of the tablet to be unsecured from the back support.

4. The apparatus of claim 3, wherein:
   the first and second lock mechanisms are inaccessible when the main body is attached to a tabletop or to another display surface and the tablet is secured, thereby preventing someone from releasing the left and right arms with the tablet and the keyboard secured and the main body attached to the tabletop.

5. The apparatus of claim 1, wherein the back support includes a lower portion that forms an acute angle with the top of the main body and an upper portion that attaches the top arm and includes a lock mechanism for the top arm, the upper portion forming an obtuse angle with the lower portion.

6. The apparatus of claim 5, wherein the acute angle provides a space for a tablet stand such that the tablet, keyboard, and tablet stand are securable together with the tablet stand in a deployed configuration.

7. The apparatus of claim 6, further comprising a blocker tab that is hinged about an axis extending along the top of the main body where the back support extends from the main body, the blocker tab configurable to block a back portion of the top of the main body in a first configuration and to open the back portion of the top of the main body in a second configuration to accommodate different types of tablet stands.

8. The apparatus of claim 1, wherein the left and right side braces are configurable to secure a tablet in a first position with a lower edge of the tablet located substantially along the top of the main body and in a second position with a lower edge of the tablet displaced above the top of the main body.

9. The apparatus of claim 1, wherein the left and right side braces each form a first slot extending parallel to the top of the main body to secure sides of the keyboard and a second slot extending at an obtuse angle to the top of the main body to secure sides of the tablet.

10. The apparatus of claim 1, wherein the front side brace is hook-shaped in cross-section along a vertical plane to engage a front edge of a keyboard, the front side brace configurable to extend different distances from the front wall of the main body to accommodate keyboards of different sizes.

11. An apparatus for physically securing a tablet, keyboard, and tablet stand to a tabletop of a display table or to another display surface with the tablet stand deployed, the apparatus comprising:
   a main body having a top surface;
   a back support extending from a back edge of the top surface, the back support including a back support surface that extends along a plane that forms an obtuse angle with the top surface to support the tablet with the tablet stand deployed;
   a top arm attached to the back support, the top arm extendable and retractable relative to the back support to secure a top edge of the tablet;
   a left arm, a right arm, and a front arm each of which is extendable and retractable relative to the main body;

a left side brace and a right side brace, attached to the left and right arms respectively, and configured to engage left sides and right sides, respectively, of the keyboard and the tablet with the tablet stand deployed;

a first lock mechanism configured to lock the left and right arms in place with the left and right arms at least partially retracted into the main body to engage the keyboard and the tablet; and a second lock mechanism configured to lock the top arm in place with the top arm at least partially retracted with respect to the back support.

12. The apparatus of claim 11, wherein:

the top arm is spring-loaded to extend outward along the plane when the second lock mechanism is disengaged to allow insertion of the tablet; and the second lock mechanism includes a ratchet to allow only inward movement of the top arm and prevent outward movement of the top arm when the second lock mechanism is engaged.

13. The apparatus of claim 12, wherein the second lock mechanism is inaccessible with the tablet lying along the back support surface.

14. The apparatus of claim 11, wherein the left side brace and the right side brace each include a respective slot extending along the plane to engage left and right sides respectively of the tablet with the tablet lying along the back support surface.

15. The apparatus of claim 14, wherein the left side brace and the right side brace are configurable to engage a lower edge of the tablet at a predetermined height above the top surface in a first configuration and to engage left and right sides of the tablet and not the lower edge of the tablet in a second configuration.

16. The apparatus of claim 11, wherein the back support includes a lower portion that that forms an acute angle with the top surface such that with the tablet in place extending along the plane, the tablet, top surface, and the lower portion form a volume that is triangular in cross-section to accommodate the tablet stand.

17. The apparatus of claim 16, further comprising a blocker tab that is configurable to block at least a portion of the top surface in the volume in a first configuration to accommodate a tablet stand having a first horizontal extent and to leave the portion of the top surface in the volume open in a second configuration to accommodate a tablet stand having a second horizontal extent.

18. The apparatus of claim 11, further comprising a plurality of fasteners that extend downward from a bottom surface of the main body and are attachable to a tabletop of a display table or to another display surface to thereby secure the main body to the tabletop or other display surface.

19. An apparatus for physically securing a tablet, keyboard, and tablet stand in a deployed configuration to a tabletop of a display table or to another display surface, the apparatus comprising:

a main body having a top surface, a bottom surface, and walls that extend between the top and bottom surfaces;

a left slot in a left wall of the main body;

a left arm that extends through the left slot and is extendable and retractable relative to the main body;

a left side brace attached to the left arm, the left side brace including a lower slot parallel to the top surface to secure a left side of the keyboard and an upper slot at an obtuse angle to the lower slot to secure the left side of the tablet;

a right slot in a right wall of the main body;

a right arm that extends through the right slot and is extendable and retractable relative to the main body;

a right side brace attached to the right arm, the right side brace including a lower slot parallel to the top surface to secure a right side of the keyboard and an upper slot at an obtuse angle to the lower slot to secure the right side of the tablet;

a front side brace extending from a front wall of the main body and forming a front slot to secure a front edge of the keyboard;

a back support extending from the top surface of the main body;

a top arm extending from the back support, the top arm is extendable and retractable relative to the back support along a plane that intersects the top surface of the main body at an oblique angle; and a plurality of fasteners that extend downward from the bottom surface of the main body and are attachable to a tabletop of a display table or to another display surface to thereby secure the main body to the tabletop or other display surface.

20. The apparatus of claim 19, further comprising:

a first ratchet configured to secure the left and right arms in place in a retracted position;

a first spring configured to extend the left and right arms from the main body in response to release of the first ratchet;

a second ratchet configured to secure the top arm in place in a retracted position; and a second spring configured to extend the top arm from the back support in response to release of the second ratchet.

* * * * *